(12) United States Patent
Taylor et al.

(10) Patent No.: US 11,346,381 B2
(45) Date of Patent: May 31, 2022

(54) TELESCOPING BOOM WITH CYCLING SLIT-TUBE DEPLOYER

(71) Applicant: Eagle Technology, LLC, Melbourne, FL (US)

(72) Inventors: Robert M. Taylor, Rockledge, FL (US); Philip J. Henderson, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 246 days.

(21) Appl. No.: 16/577,915

(22) Filed: Sep. 20, 2019

(65) Prior Publication Data

US 2021/0088064 A1   Mar. 25, 2021

(51) Int. Cl.
| | | |
|---|---|---|
| *F16B 7/10* | (2006.01) | |
| *E04H 12/18* | (2006.01) | |
| *H01Q 1/10* | (2006.01) | |

(52) U.S. Cl.
CPC .......... *F16B 7/105* (2013.01); *E04H 12/182* (2013.01); *H01Q 1/10* (2013.01)

(58) Field of Classification Search
CPC ........ F16B 7/105; E04H 12/182; H01Q 1/10; E04C 3/005; B64G 1/222; B64G 1/44; B64G 1/66
See application file for complete search history.

(56) References Cited

U.S. PATENT DOCUMENTS

| | | |
|---|---|---|
| 2,784,987 A | 3/1957 | Corcoran |
| 2,888,111 A | 5/1959 | Evans |
| 3,361,456 A | 1/1968 | Durand |
| 3,474,833 A | 10/1969 | Garrette et al. |
| 3,688,455 A | 9/1972 | Zebuhr |
| 4,047,821 A | 9/1977 | Hoke et al. |
| 4,062,156 A | 12/1977 | Roth et al. |
| 4,079,987 A | 3/1978 | Bumgardener |
| 4,254,423 A | 3/1981 | Reinhard |
| 4,385,849 A | 5/1983 | Crain |

(Continued)

OTHER PUBLICATIONS

Pellegrino S: "Large Retractable Appendages in Spacecraft", Journal of Spacecraft and Rockets, American Institute of Aeronautics and Astronautics, Reaston, VA, US, vol. 32, No. 6, Nov. 1, 1995 (Nov. 1, 1995), pp. 1006-1014.

(Continued)

*Primary Examiner* — Anita M King
(74) *Attorney, Agent, or Firm* — Fox Rothschild LLP; Carol E. Thorstad-Forsyth; Robert J. Sacco

(57) ABSTRACT

Systems and methods for extending a boom. The methods comprise: placing a drive train assembly in a start configuration in which an engagement member of the drive train assembly is coupled to an inner telescoping segment of the boom; rotating a spool in a first direction so as to unwind a slit-tube that is coupled to the engagement member; causing the inner telescoping segment to move in a direction away from a proximal end of the boom as the slit-tube is being unwound from the spool; and coupling the inner telescoping segment to an adjacent telescoping segment when the inner telescoping segment reaches an extended position. The slit-tube extends a distance inside the boom that is equal to or less than a length of the adjacent telescoping segment when the inner telescoping segment is in the extended position.

22 Claims, 18 Drawing Sheets

(56) References Cited

U.S. PATENT DOCUMENTS

| | | | |
|---|---|---|---|
| 4,587,526 A | 5/1986 | Ahl, Jr. | |
| 4,657,112 A | 4/1987 | Ream et al. | |
| 4,663,900 A | 5/1987 | Rehm et al. | |
| 4,793,197 A | 12/1988 | Petrovsky | |
| 4,871,138 A | 10/1989 | Sauter | |
| 5,163,650 A | 11/1992 | Adams et al. | |
| 5,279,084 A | 1/1994 | Atsukawa | |
| 5,315,795 A | 5/1994 | Chae et al. | |
| 6,095,714 A | 8/2000 | Spencer | |
| 7,299,589 B2 | 11/2007 | Campbell et al. | |
| 9,608,333 B1 | 3/2017 | Toledo et al. | |
| 10,131,452 B1 | 11/2018 | Rohweller et al. | |
| 10,147,995 B2 | 12/2018 | Daton-Lovett | |
| 10,259,599 B2* | 4/2019 | Hart, III | B64G 1/66 |
| 10,611,502 B2* | 4/2020 | Hensley | B64G 1/222 |
| 11,047,132 B2* | 6/2021 | Turse | E04C 3/005 |
| 2015/0259911 A1* | 9/2015 | Freebury | B29C 70/30 |
| | | | 52/108 |
| 2017/0081046 A1 | 3/2017 | Spence et al. | |
| 2020/0248471 A1* | 8/2020 | Chambers | F21L 4/02 |
| 2020/0408235 A1* | 12/2020 | Moody | H01Q 1/103 |

OTHER PUBLICATIONS

M. E. Humphries: "A Mechanical Drive for Retractable Telescopic Masts", 15th Aerospace Mechanisms Symposium: Proceedings; May 14-15, 1981; George C. Marshall Space Flight Center, Marshall Space Flight Center, Alabama, USA, vol. 2181, May 14, 1981 (May 14, 1981), May 15, 1981 (May 15, 1981), pp. 205-217.
European Search Report issued in EP 20194963.3 dated Jan. 13, 2021.

* cited by examiner

```
┌─────────────┐
│ Begin  2102 │
└─────────────┘
       ▼
┌──────────────────────────────────────────────────────────────────────────────┐
│ Place a drive train assembly in a start configuration for sequentially       │
│ extending a plurality of telescoping segments of a collapsed boom       2104 │
└──────────────────────────────────────────────────────────────────────────────┘
       ▼
┌──────────────────────────────────────────────────────────────────────────────┐
│              Use a motor to rotate a spool in a first direction         2106 │
└──────────────────────────────────────────────────────────────────────────────┘
       ▼
┌──────────────────────────────────────────────────────────────────────────────┐
│ Cause an inner most telescoping segment to move in a direction away from a   │
│ proximal end of the boom as a slit-tube is unwound from the spool       2108 │
└──────────────────────────────────────────────────────────────────────────────┘
       ▼
┌──────────────────────────────────────────────────────────────────────────────┐
│ Continue to rotate the spool until the slit-tube is prevented from or        │
│ otherwise can no longer travel in a direction away from the boom's      2110 │
│ proximal end                                                                 │
└──────────────────────────────────────────────────────────────────────────────┘
       ▼
┌──────────────────────────────────────────────────────────────────────────────┐
│ Couple the extended inner most telescoping segment to                        │
│ a collapsed adjacent middle telescoping segment                         2112 │
└──────────────────────────────────────────────────────────────────────────────┘
       ▼
┌──────────────────────────────────────────────────────────────────────────────┐
│ Use the motor to rotate the spool in a direction towards the boom's          │
│ proximal end                                                            2114 │
└──────────────────────────────────────────────────────────────────────────────┘
       ▼
┌──────────────────────────────────────────────────────────────────────────────┐
│ Cause an engagement member of the drive train assembly to move in a          │
│ direction away from the distal end of the extended inner most telescoping    │
│ segment as a slit-tube is rewound onto the spool                        2116 │
└──────────────────────────────────────────────────────────────────────────────┘
       ▼
┌──────────────────────────────────────────────────────────────────────────────┐
│ Continue to re-wind the slit-tube until the engagement member of the drive   │
│ train assembly is coupled to the collapsed middle telescoping segment   2118 │
└──────────────────────────────────────────────────────────────────────────────┘
       ▼
┌──────────────────────────────────────────────────────────────────────────────┐
│ Use a motor to rotate the spool in the direction away from the boom's        │
│ proximal end                                                            2120 │
└──────────────────────────────────────────────────────────────────────────────┘
       ▼
┌──────────────────────────────────────────────────────────────────────────────┐
│ Cause the middle telescoping segment to move in a direction towards a distal │
│ end of the partially collapsed boom as a slit-tube is unwound from the spool │
│                                                                         2122 │
└──────────────────────────────────────────────────────────────────────────────┘
       ▼
┌──────────────────────────────────────────────────────────────────────────────┐
│ Continue to rotate the spool until the slit-tube is prevented                │
│ from or otherwise can no longer travel away from the boom's proximal end     │
│                                                                         2124 │
└──────────────────────────────────────────────────────────────────────────────┘
       ▼
┌──────────────────────────────────────────────────────────────────────────────┐
│ Couple the extended middle telescoping segment to                            │
│ an outer most telescoping segment                                       2126 │
└──────────────────────────────────────────────────────────────────────────────┘
       ▼
┌──────────────────────────────────────────────────────────────────────────────┐
│ Optionally use the motor to rotate the spool in the second direction so that │
│ the slit-tube is once again re-wound onto the spool                     2128 │
└──────────────────────────────────────────────────────────────────────────────┘
       ▼
┌──────────────────────────────────────┐
│ End or perform other processing 2130 │
└──────────────────────────────────────┘
```

TELESCOPING BOOM WITH CYCLING SLIT-TUBE DEPLOYER

BACKGROUND

Statement of the Technical Field

The present document concerns antenna system structures. More particularly, the present document concerns reflector antenna systems with telescoping booms having a cycling slit-tube deployer.

Description of the Related Art

Extendible mast assemblies have been used in a variety of applications. One such application is deployable antenna reflector applications. Various conventional deployable antenna structures exist that include a mesh reflector for directing energy into a desired pattern. The mesh reflector is deployed from a collapsed position to a deployed position using an extendible mast assembly. Conventional extendable mast assemblies are complex, relatively heavy, and costly to manufacture.

SUMMARY

This document concerns systems and methods for extending a boom. The methods comprise: placing a drive train assembly in a start configuration in which an engagement member of the drive train assembly is coupled to an inner telescoping segment of the boom; rotating a spool in a first direction so as to unwind a slit-tube that is coupled to the engagement member; causing the inner telescoping segment to move in a direction away from a proximal end of the boom as the slit-tube is being unwound from the spool; and coupling the inner telescoping segment to an adjacent telescoping segment when the inner telescoping segment reaches an extended position. The slit-tube extends a distance inside the boom that is equal to or less than a length of the adjacent telescoping segment when the inner telescoping segment is in the extended position.

In some scenarios, the adjacent telescoping segment is a middle telescoping segment that resides between the inner telescoping segment and an outer telescoping segment. The outer telescoping segment may have a length that is shorter than lengths of the inner and middle telescoping segments. The inner telescoping segment and the middle telescoping segment are sequentially extended by the drive train assembly. Accordingly, the methods also comprise: rotating the spool in a second direction so as to re-wind the slit-tube onto the spool, subsequent to when the inner telescoping segment is coupled to the middle telescoping segment; de-coupling the engagement member of the drive train assembly from the inner telescoping segment as the slit-tube is being pulled towards the proximal end of the boom during the slit-tube's re-winding; continuing to rotate the spool in the second direction until the slit-tube is prevented from traveling any further in a direction towards the proximal end of the boom; coupling the engagement member of the drive train assembly to the middle telescoping segment which is in a collapsed configuration; rotating the spool in the first direction so as to once again unwind the slit-tube from the spool; causing the middle telescoping segment to move in a direction away from the proximal end of the boom as the slit-tube is being unwound from the spool; and/or coupling the middle telescoping segment to the outer telescoping segment when the middle telescoping segment reaches an extended position. The slit-tube extends a distance inside the boom that is equal to or less than a length of the outer telescoping segment when the middle telescoping segment and the inner telescoping segment are in the extended position.

BRIEF DESCRIPTION OF THE DRAWINGS

This disclosure is facilitated by reference to the following drawing figures, in which like numerals represent like items throughout the figures.

FIG. 21 provides a flow diagram of an illustrative method for extending a boom.

DETAILED DESCRIPTION

Figure 1:
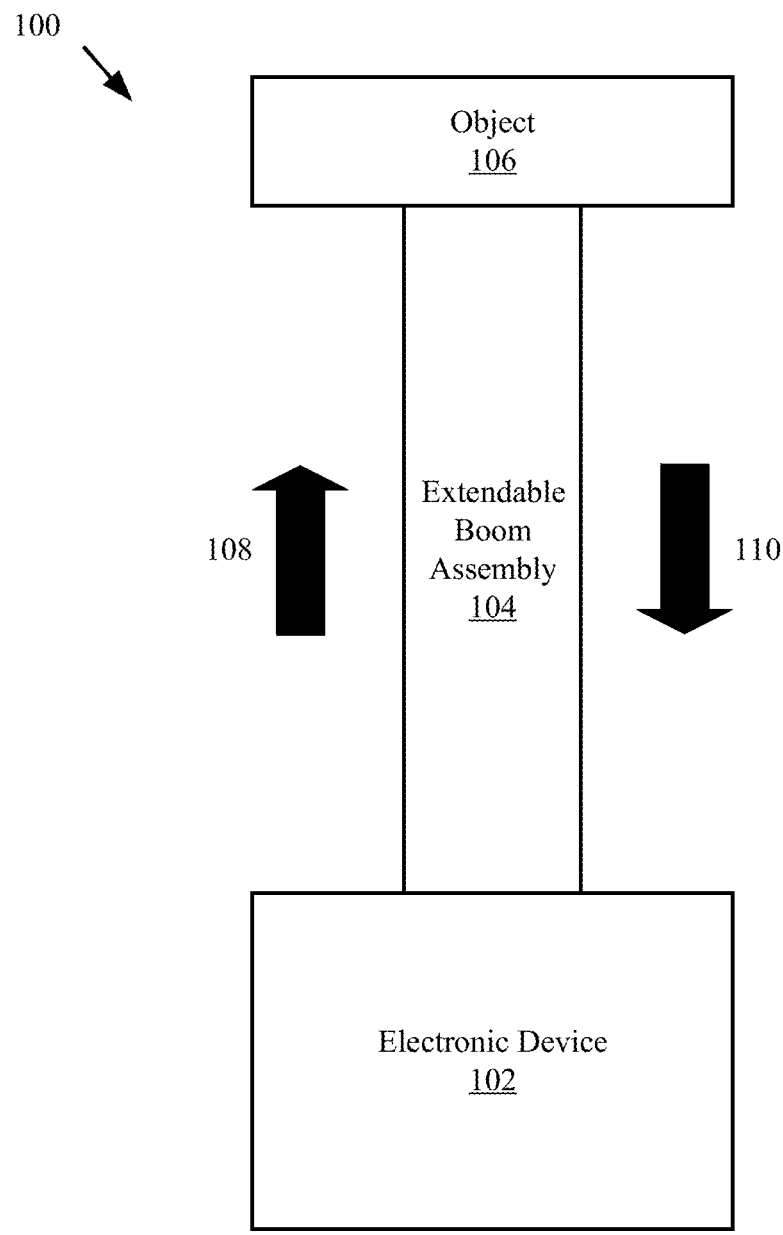
FIG. 1 is an illustration that is useful for understanding applications for the present solution.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

This document generally concerns systems and methods for extending a boom. The methods comprise: placing a drive train assembly in a start configuration in which an engagement member of the drive train assembly is coupled to an inner telescoping segment of the boom; rotating a spool in a first direction so as to unwind a slit-tube that is coupled to the engagement member; causing the inner telescoping segment to move in a direction away from a proximal end of the boom as the slit-tube is being unwound from the spool; and coupling the inner telescoping segment to an adjacent telescoping segment when the inner telescoping segment reaches an extended position. The slit-tube extends a distance inside the boom that is equal to or less than a length of the adjacent telescoping segment when the inner telescoping segment is in the extended position.

In some scenarios, the adjacent telescoping segment is a middle telescoping segment that resides between the inner telescoping segment and an outer telescoping segment. The inner telescoping segment and the middle telescoping segment are sequentially extended by the drive train assembly. Accordingly, the methods also comprise: rotating the spool in a second direction so as to re-wind the slit-tube onto the spool, subsequent to when the inner telescoping segment is coupled to the middle telescoping segment; de-coupling the engagement member of the drive train assembly from the inner telescoping segment as the slit-tube is being pulled towards the proximal end of the boom during the slit-tube's re-winding; continuing to rotate the spool in the second direction until the slit-tube is prevented from traveling any further in a direction towards the proximal end of the boom; coupling the engagement member of the drive train assembly to the middle telescoping segment which is in a collapsed configuration; rotating the spool in the first direction so as to once again unwind the slit-tube from the spool; causing the middle telescoping segment to move in a direction away from the proximal end of the boom as the slit-tube is being unwound from the spool; and/or coupling the middle telescoping segment to the outer telescoping segment when the middle telescoping segment reaches an extended position. The slit-tube extends a distance inside the boom that is equal to or less than a length of the outer telescoping segment when the middle telescoping segment and the inner telescoping segment are in the extended position.

Referring now to FIG. 1, there is provided an illustration of an illustrative system 100. System 100 comprises a boom assembly 104 coupled between an electronic device 102 (e.g., a satellite) and an object 106 (e.g., a reflector, a solar array, a magnetometer, etc.). The boom assembly 104 is extendable and/or retractable such that the object 106 can be selectively moved in a direction 108 away from the electronic device 102 and/or in a direction 110 towards the electronic device 102. The manner in which the boom assembly 104 deploys and retracts the object 106 will become evident as the discussion progresses.

The boom assembly 104 can be used in any application in which an object needs to be deployed away from another object and supported in the deployed position. One such application includes deployable mesh reflector applications. An illustrative deployable mesh reflector antenna system 200 will now be described in relation to FIGS. 2-5.

Figure 2:
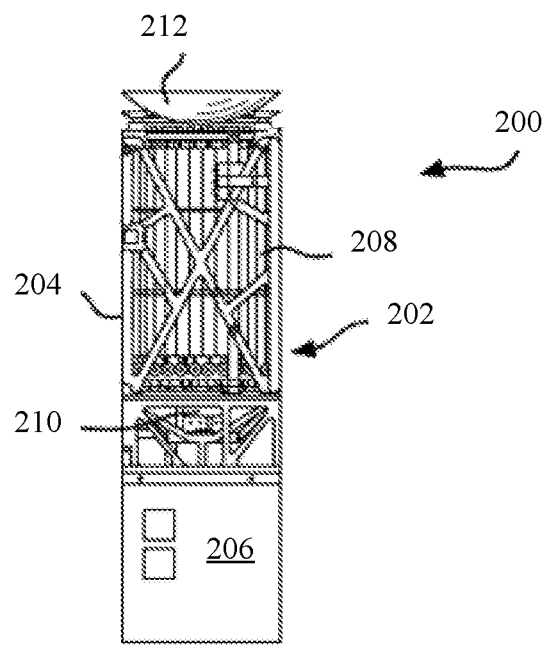
FIG. 2 is a side elevation view of folded optics reflector in a stowed configuration.
Figure 3:
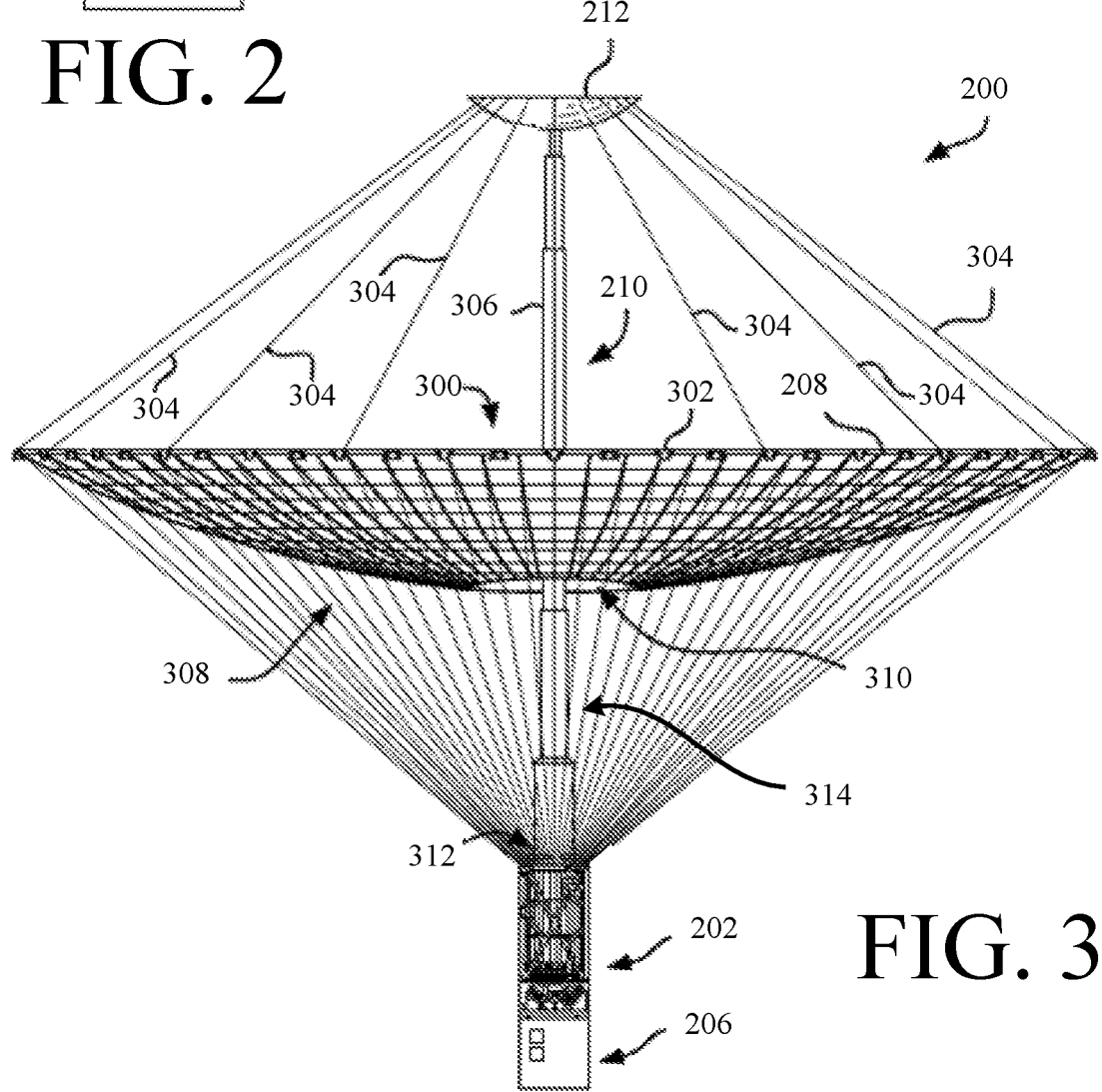
FIG. 3 is a side elevation view of the folded optics reflector of FIG. 1 in a deployed configuration.

As shown in FIGS. 2-3, the deployable mesh reflector system 200 comprises a housing 202 which is configured to stow a deployable mesh reflector 300. The housing 202 generally comprises a frame structure 204 which defines an interior space for stowing of the deployable mesh reflector 300. In some scenarios, the housing 120 can comprise a portion of a spacecraft 206 which comprises various types of equipment, including radio communication equipment.

The frame structure 204 may have various configurations and sizes depending on the size of the deployable mesh reflector 300. By way of example, the system 200 may include a deployable mesh reflector with a 1 meter aperture that is stowed within a housing 202 that is of 2 U cubes at packaging and having an approximately 10 cm×10 cm×20 cm volume. Alternatively, the system 200 may include a deployable mesh reflector with a 3 meter aperture that is stowed within a housing 202 that is of 12 U cubes at packaging and having an approximately 20 cm×20 cm×30 cm volume. Of course, the solution is not limited in this regard and other sizes and configurations of the systems are also possible. In some scenarios, the housing 202 is in the nanosat or microsat size range.

The deployable mesh reflector 300 generally comprises a collapsible, mesh reflector surface 302 which is supported by a circumferential hoop assembly 208. The reflector surface has a shape when deployed that is selected so as to concentrate RF energy in a desired pattern. As such, the reflector surface can be parabolic or can be specially shaped in accordance with the needs of a particular design. For example, in some scenarios, the reflector surface can be specially shaped in accordance with a predetermined polynomial function. Further, the reflector surface 302 can be a surface of revolution, but it should be understood that this is not a requirement. There are some instances when the reflector surface can be an axisymmetric shape.

The hoop assembly 208 is supported by the mast assembly 210 via a plurality of cords 304. Generally, the mast assembly 210 includes an extendable boom 306 with sub-reflector 212 secured to at a free end thereof. Notably, in the context of FIG. 1, the satellite 206 corresponds to the electronic device 102, the extendable boom 306 corresponds to the extendable boom 104, and the sub-reflector 212 corresponds to the object 106.

Referring again to FIGS. 2-3, a further network of cords 308 can extend between the housing 202 and the mesh reflector 300 to help define the shape of the mesh reflector surface 302. The hoop assembly 208 and the mast assembly 210 are configured to collapse into a stowed configuration which fits within the interior space of the housing 202. When the antenna system arrives at a deployment location (e.g., an orbital location), the antenna can be transitioned to the deployed configuration shown in FIG. 3.

The sub-reflector 212, in addition to facilitating a folded optic antenna configuration, can also function as part of the support system for the mesh reflector surface 300. In particular, the structure of the sub-reflector 212 can be used to anchor or support ends of the cords 304.

A drive train assembly (not shown) is positioned within the housing 202 and is configured to telescopically extend the boom 306 from the stowed configuration shown in FIG. 1 to the deployed configuration shown in FIG. 2. A circular aperture 310 is defined in the center of the mesh reflector 300. The boom extends through the circular aperture 310 when deployed.

The extending of the boom 306 can be facilitated in accordance with the process discussed below in relation to FIGS. 6-19. Generally, the boom 306 is extended using a slit-tube unrolled from a spool via a motor. The slit-tube can have two configurations. In the stowed configuration, the slit-tube is flattened laterally and rolled longitudinally on the spool. In the deployed configuration, the slit-tube is extended longitudinally and rolled or curved laterally. The slit-tube includes a curved tape, a lenticular cross-sectional tube, or any other tube structure that can be flattened or rolled. The slit-tube is used to iteratively push telescoping sections of the boom is a direction away from the spool. When the boom 306 is in its extended position, each pair of adjacent telescoping sections are locked together via a coupling mechanism (e.g., a resiliently biased pin of an inner telescoping section of the pair which extends through an aperture formed in an outer telescoping section of the pair).

Notably, the most proximal (or outer most) telescoping segment 312 is shorter than the other telescoping segments. This configuration of telescoping segment 312 is employed so that the slit-tube does not buckle when the cords 308 are being tensioned during the extension of the next proximal telescoping segment 314.

The hoop assembly 208 is advantageously configured to be self-deploying such that the deployed hoop structure shown in FIG. 2 is achieved without any motors or actuators other than the drive train assembly which is used to extend the mast. Still, the solution is not limited in this respect and in some scenarios a motorized or actuated deployment of the hoop is contemplated.

Deployable mesh reflectors based on the concept of a hoop assembly and an extendable mast are known. For example, details of such an antenna system are disclosed in U.S. Pat. No. 9,608,333 which is incorporated herein by reference.

Figure 4:
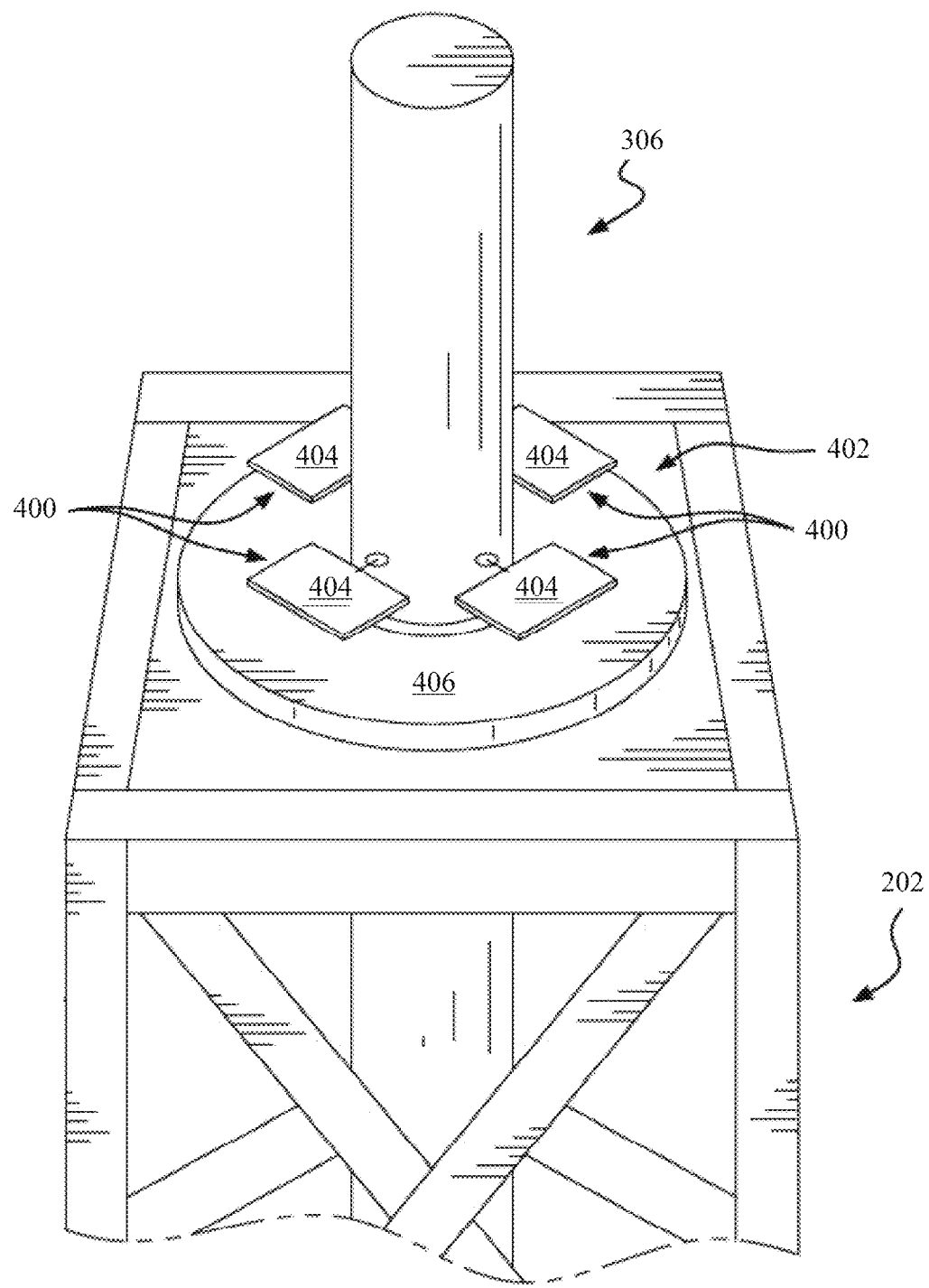
FIG. 4 is a conceptual drawing that is useful for understanding one example of an antenna feed configuration for use with a folded optics reflector.

Referring now to FIG. 4, an RF feed 400 for the antenna system can be disposed behind the primary reflector surface. The RF feed 400 can be disposed around a periphery of the mast, in an area which is on or adjacent to the housing 202. More particularly, the RF feed 400 can be disposed adjacent to a deployment face 402 of the housing 202 from which the mast assembly 210 extends in its deployed configuration. The RF feed 400 comprises a plurality of distributed feed elements 404 disposed circumferentially around a periphery of a mast assembly 306. The distributed feed elements 404 can be comprised of a plurality of monopole antennas which are suspended over a ground plate 406. In some scenarios, the distributed feed elements can be configured to operate as a phased array. However, the solution is not limited in this respect and other feed arrangements can also be used to provide an advantageous RF beam pattern as described below.

Figure 5:
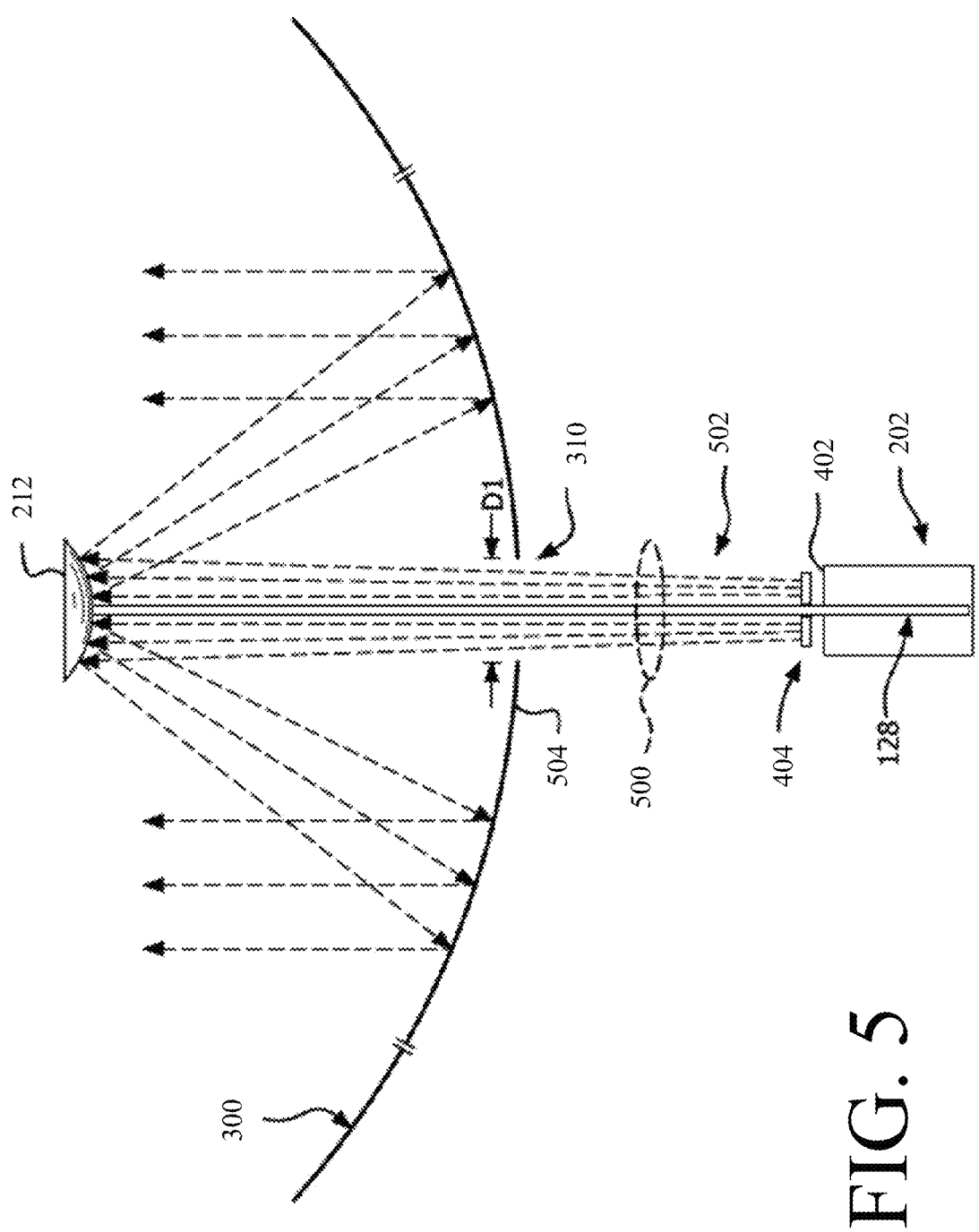
FIG. 5 is a schematic drawing which is useful for understanding the operation of the antenna system shown in FIGS. 2-4.
Figure 6:
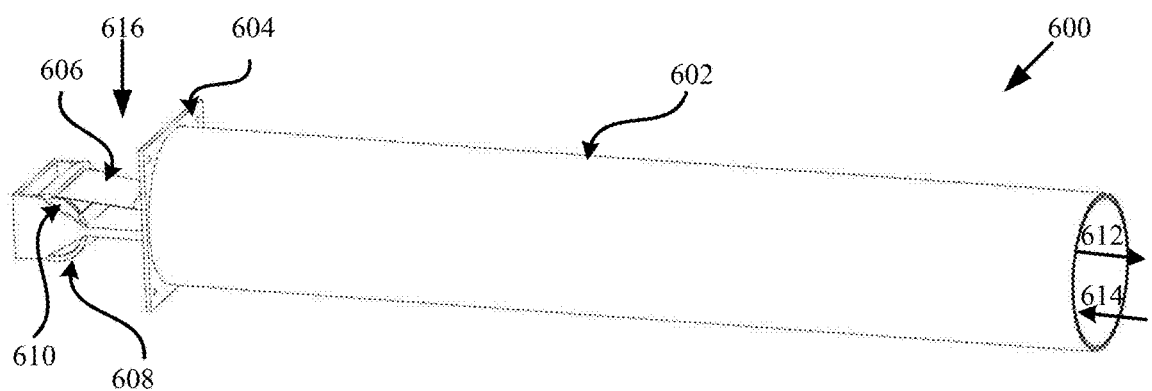
FIG. 6 is a perspective view an extendable boom assembly in accordance with the present solution.
Figure 7:
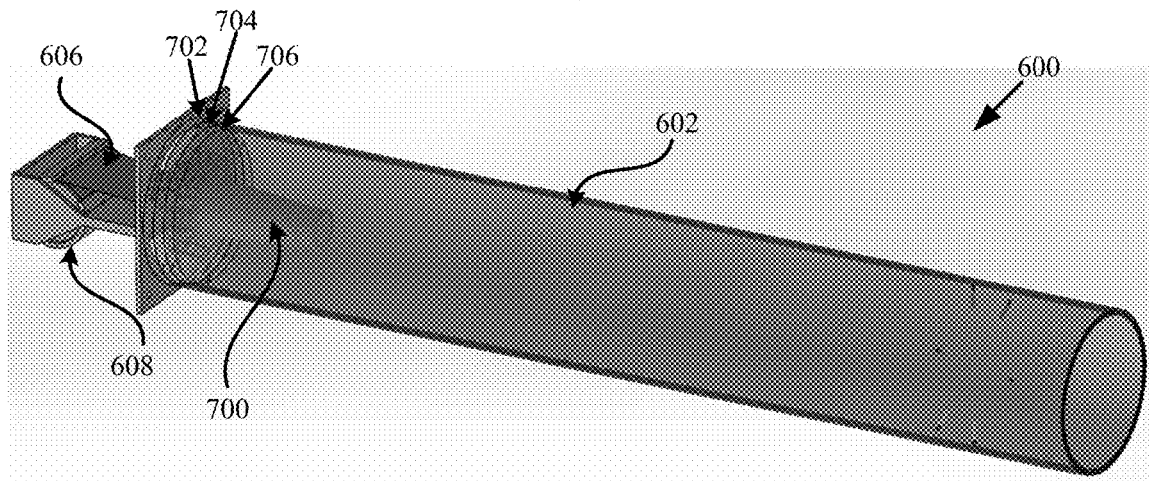
FIG. 7 is a perspective view the extendable boom assembly of FIG. 6 with telescoping segments shown in a semi-transparent state.
Figure 8:
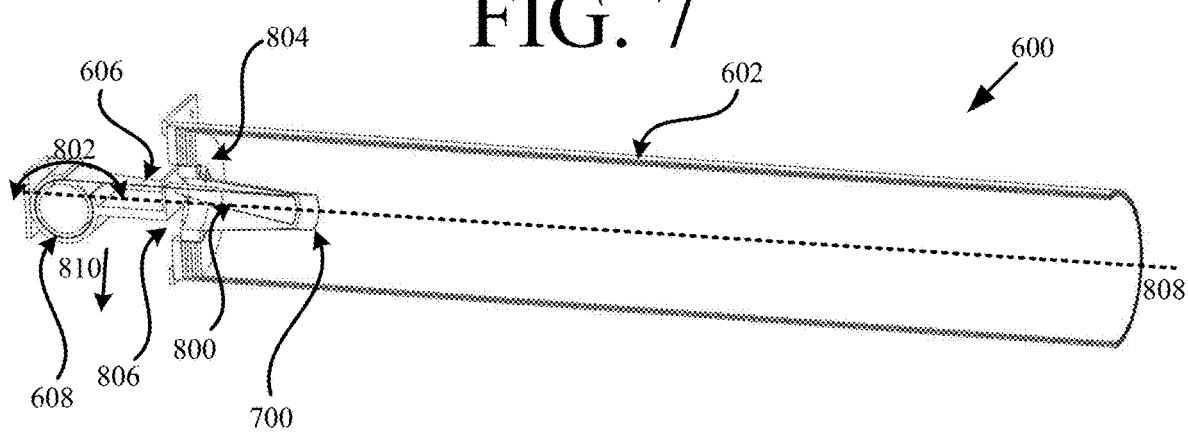
FIG. 8 is a cross-sectional view of the extendable boom assembly of FIGS. 6-7.

Referring now to FIG. 5, the distributed feed elements 404 are collectively configured so that they are capable of generating an RF feed beam pattern 500 that is suitable for communicating RF energy 502 through the aperture 310 that is formed in the mesh reflector 300. The exact configuration of the distributed feed elements is not critical provided that the RF beam results in negligible amounts of RF energy being reflected back toward the RF feed 400 from the rear surface 504 of the mesh reflector 300. The RF energy 502 is reflected by the sub-reflector 212 and directed toward the surface of the primary mesh reflector 300 which forms the final beam. It will be appreciated that FIG. 5 is illustrative of a transmit scenario, but the solution is not limited in this regard. The antenna system 200 will operate in a similar manner in a reciprocal manner the receive direction such that both receive and transmit operations are supported.

Referring now to FIGS. 6-19, there are provided illustrations of a mast assembly 600. Extendable boom 104 of FIG. 1 and mast assembly 210 of FIG. 2 are the same as or similar to mast assembly 600. As such, the following discussion of mast assembly 600 is sufficient for understanding extendable boom 104 of FIG. 1 and mast assembly 210 of FIG. 2.

Mast assembly 600 comprises a boom 602 having a plurality of telescoping segments 702, 704, 706. The telescoping segments 702, 704, 706 have a stacked arrangement when the boom 602 is in a collapsed or nested position shown in FIGS. 6-9. Although three telescoping segments are shown in FIGS. 6-19, the present solution is not limited in this regard. The boom 602 can have any number of telescoping segments selected in accordance with a particular application. The telescoping segments can have the same or different lengths.

The telescoping segment 702 is the outer most telescoping section that is securely coupled to a base plate 604. The outer most telescoping segment 702 does not move relative to the other telescoping segments 704, 706. The telescoping segment 706 is the inner most telescoping section with the smallest diameter of all the telescoping segments 702-706. The diameter of the telescoping segment 706 is slightly smaller than the diameter of the middle telescoping segment 704 such that the inner most telescoping segment can slide within in the middle telescoping segment 704 in two opposing directions shown by arrows 612, 614. Similarly, the diameter of the middle telescoping segment 704 is slightly smaller than the outer most telescoping segment 702 such that the middle telescoping segment 704 can slide within the outer most telescoping segment 702 in two opposing directions shown by arrow 612.

A drive train assembly 616 is positioned in proximity to the boom 602. The drive train assembly 616 is generally configured to telescopically extend the boom 602 from the collapsed configuration shown in FIGS. 6-9 to the extended configuration shown in FIG. 18. The drive train assembly 616 comprises an engagement member 700 securely coupled to an end 800 of a slit-tube 606. The other end of the slit-tube 606 is securely coupled to a spool 608. A motor 610 is provided to rotate the spool 608 in the clockwise direction and the counter clockwise direction, as shown by arrow 802.

The spool 608 is shown as at least partially extending along a center axis 808 of the boom 602 such that a bend is not provided in the slit-tube 606 between the spool 608 and the base plate 604. The present solution is not limited in this regard. The spool 608 may alternatively be offset from the center axis 808 such that a bend is provided in the slit-tube 606 between the spool 608 and the base plate 604. For example, the spool 608 is offset from the center axis 808 in a direction 810 such that a 1° to 90° bend exists in the slit-tube 606 between the spool 608 and the base plate 604. The present solution is not limited to the particulars of this example.

The drive train assembly 616 is used to iteratively or sequentially extend and/or retract the telescoping sections 704-706 of the boom 602. In this regard, the base walls 804 of the telescoping segments 702-704 have apertures 806 formed therein. The apertures 806 are sized and shaped to allow the slit-tube 606 and engagement member 700 of the drive train assembly 616 to freely pass therethrough. The engagement member 700 also has one or more mechanical coupling mechanisms integrated therewith which facilitate the selective coupling of the engagement member 700 to a single telescoping segment at any given time. The mechanical coupling mechanism(s) will be discussed below in detail.

Figure 9:
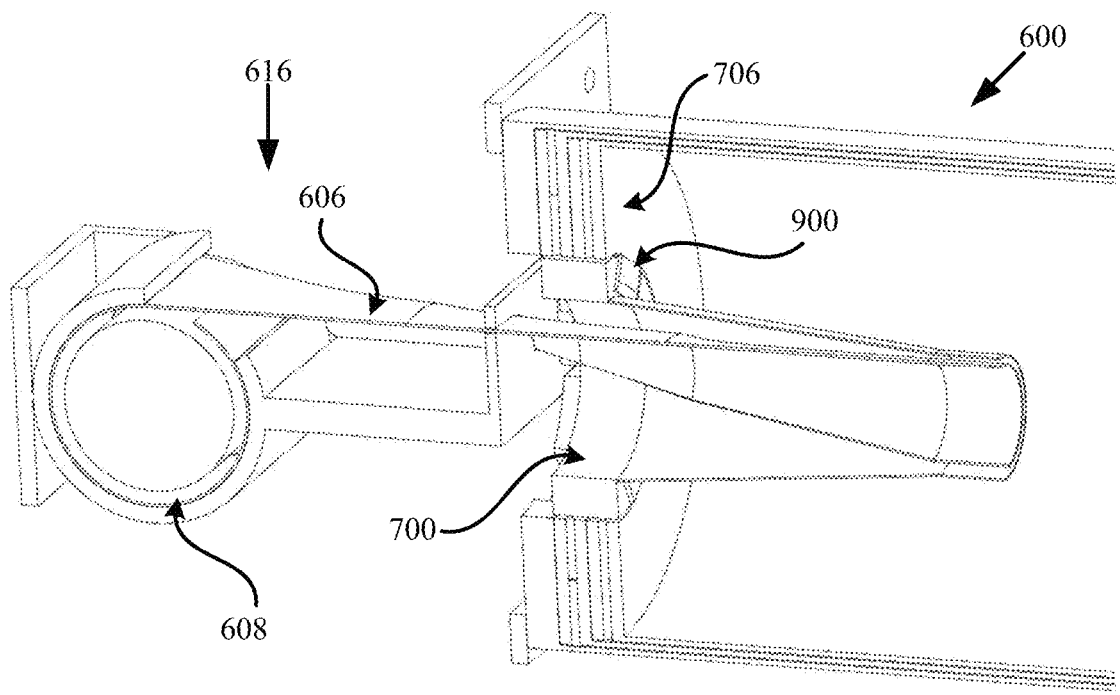
FIG. 9 is a partial cross-sectional view of the extendable boom assembly of FIGS. 6-7 in a collapsed configuration.

This process of iteratively or sequentially extending the telescoping sections 704-706 is generally shown in FIGS. 9-19. In FIG. 9, the slit-tube 606 and the engagement member 700 are in their start positions. At this time, a large portion of the slit-tube 606 is flattened laterally and rolled longitudinally on the spool 608. The engagement member 700 extends through the apertures 804 formed in the base walls 604 of the telescoping segments 702-706, and is coupled to the telescoping segment 706 via at least one mechanical coupling mechanism 900.

Figure 10:
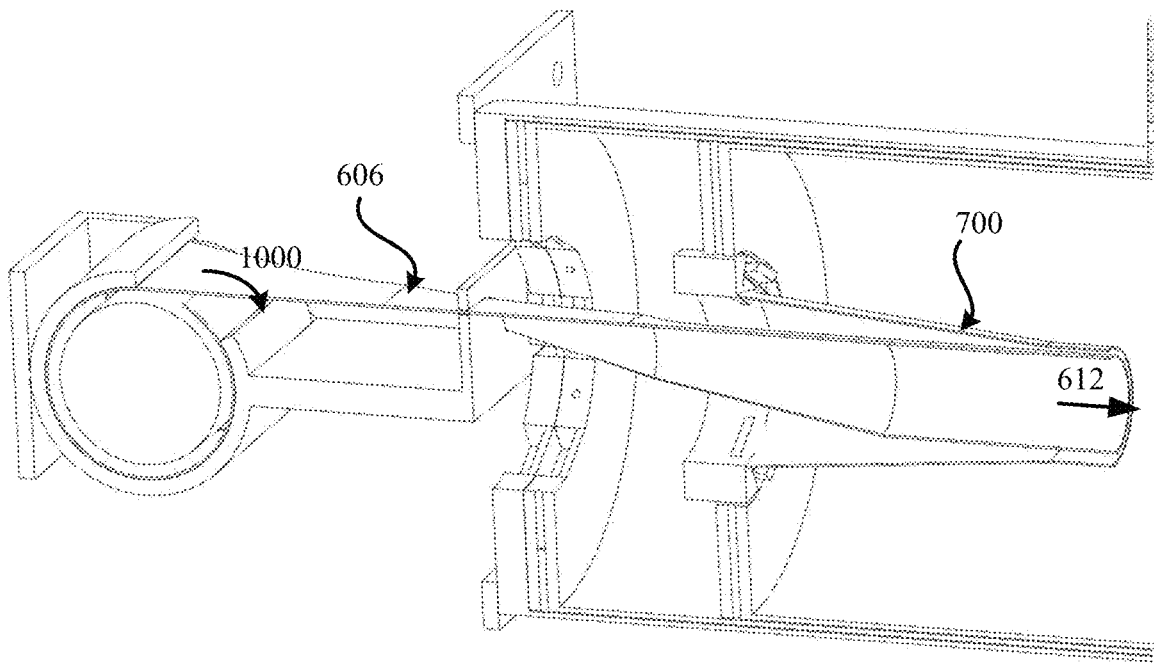
FIG. 10 is a partial cross-sectional view of the extendable boom assembly of FIGS. 6-7 with an inner most telescoping segment in a partially extended configuration.

Next, the motor 610 rotates the spool 608 in a first direction. The first direction may comprise the clockwise direction 1000, as shown in FIG. 10. The present solution is not limited in this regard. The first direction may alternatively comprise the counter clockwise direction. As the spool 608 rotates in the first direction 1000, the slit-tube 606 extends and travels inside the boom 602 so as to apply a pushing force on the engagement member 700. In effect, the engagement member 700 moves in a direction 612 away from the spool 608. Since the engagement member 700 is coupled to the telescoping segment 706, the telescoping segment 706 is caused to move in the direction 612 within the other telescoping segments 702-704.

Figure 11:
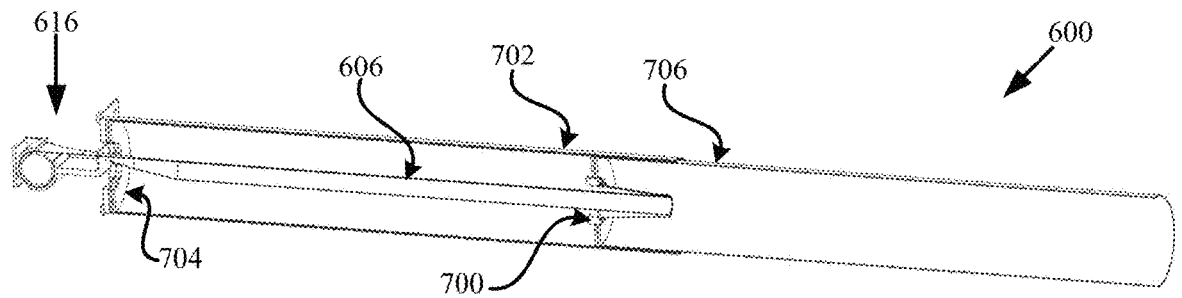
FIG. 11 is a cross-sectional view of the extendable boom assembly of FIGS. 6-7 with an inner most telescoping segment in an extended configuration.

The movement of components 700 and 706 continues until the telescoping segment 706 reaches its fully extended configuration shown in FIG. 11. When the telescoping segment 706 reaches its fully extended configuration, the telescoping segment 706 is coupled to the next inner telescoping segment 704. This coupling ensures that the telescoping segment 706 will not return to the collapsed configuration while the boom 602 is in use. This coupling is achieved using a spreader latch, a beam latch, or any other mechanism that is able to lock two telescoping segments together.

Figure 12:
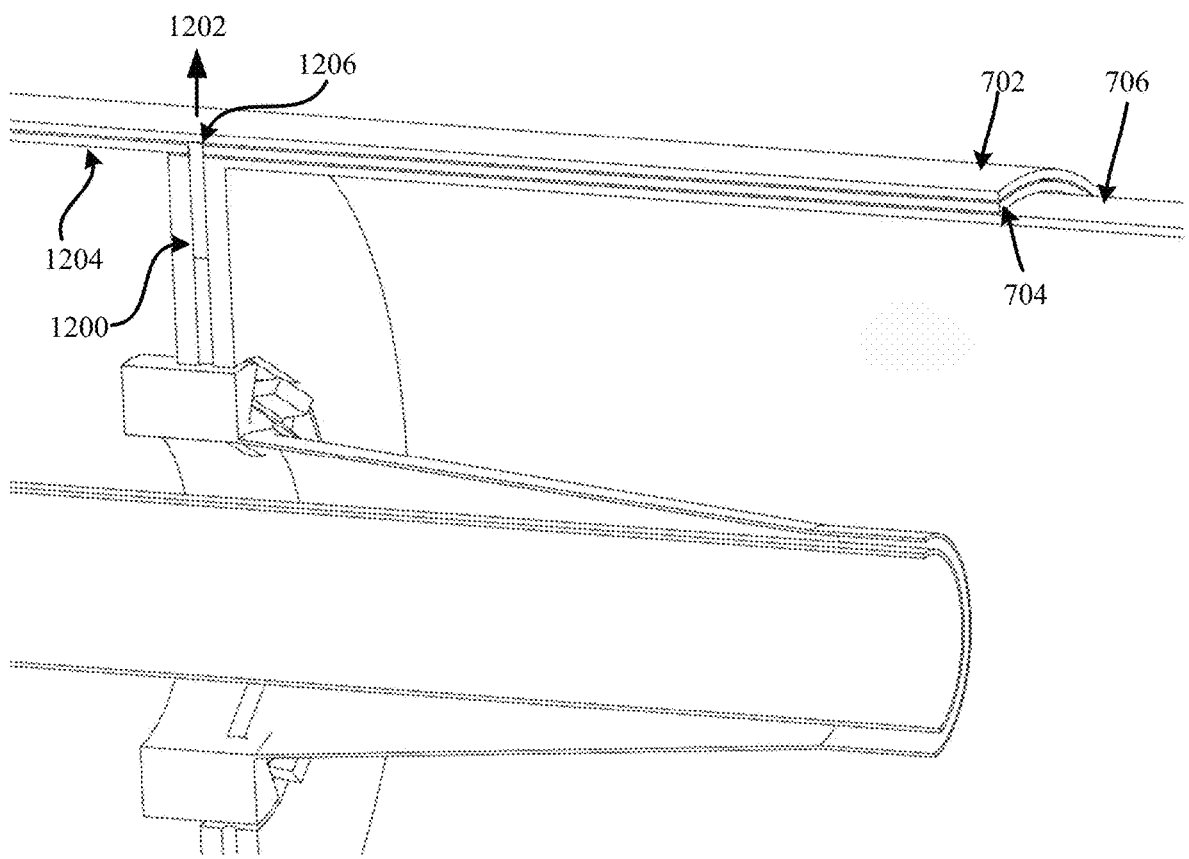
FIG. 12 is a partial cross-sectional view of the extendable boom assembly of FIGS. 6-7 with an inner most telescoping segment in an extended configuration and coupled to an adjacent telescoping segment.

In some scenarios, this coupling is achieved via a resiliently biased pin 1200, as shown in FIG. 12. The pin 1200 is resiliently biased in a direction 1202, for example, using a resilient component (not shown). The resilient component can include, but is not limited to, a spring. The pin 1200 slides against an inner surface 1204 of telescoping segment 704 as the telescoping segment 706 travels in direction 612. The resilient component pushes the pin 1200 into an aperture 1206 formed through the adjacent telescoping segment 704 when the telescoping segment 706 reaches its fully extended configuration. A mechanism (not shown) may be provided to selectively retract the resiliently biased pin 1200 from the aperture so that the boom can once again be collapsed. The present solution is not limited to the particulars of this scenario. Other coupling mechanisms can be additionally or alternatively used.

Figure 13:
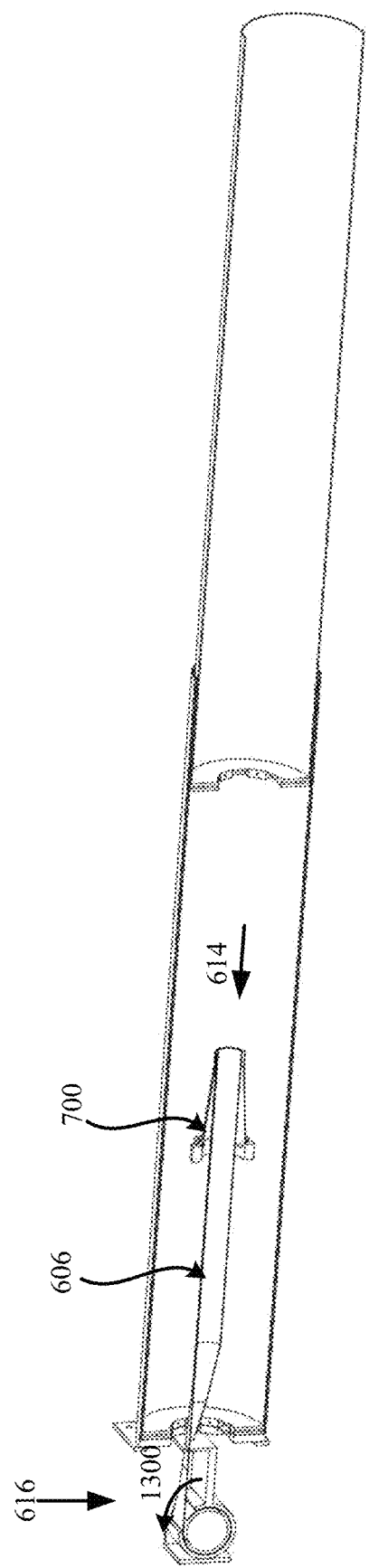
FIG. 13 is a cross-sectional view of the extendable boom assembly of FIGS. 6-7 with a slit-tube being rolled onto a spool.
Figure 14:
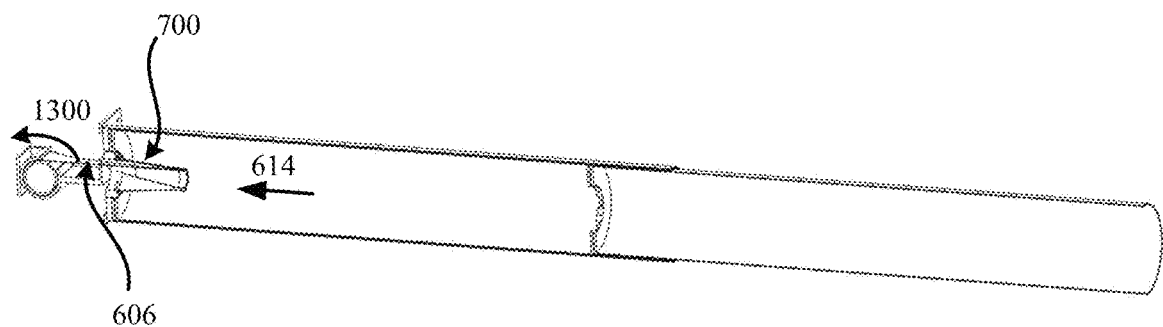
FIG. 14 is a cross-sectional view of the extendable boom assembly of FIGS. 6-7 with the slit-tube rolled onto a spool.
Figure 15:
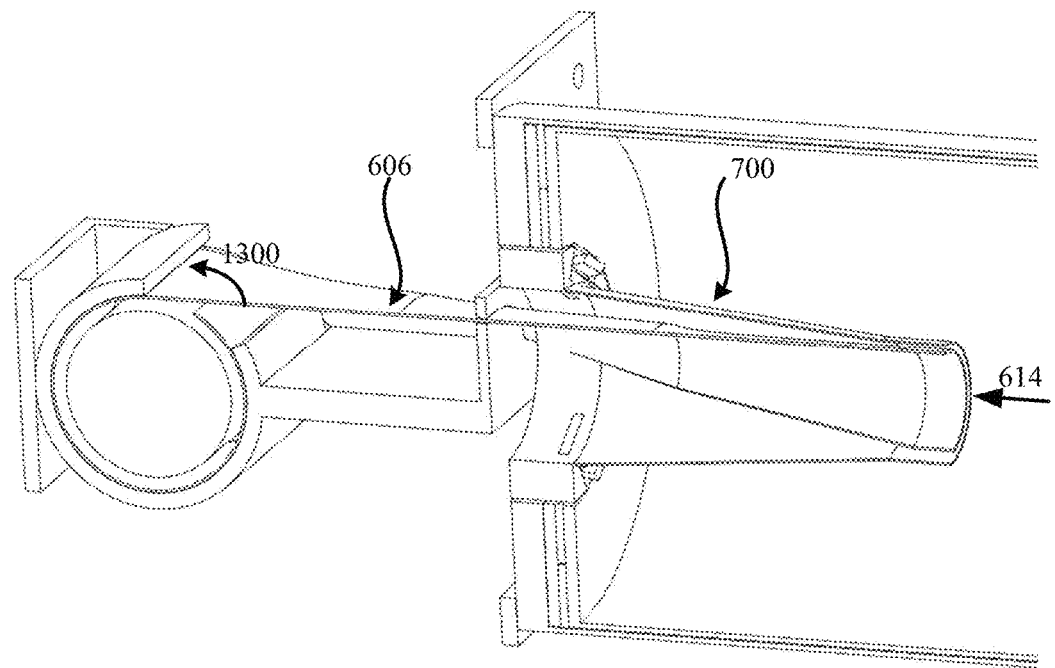
FIG. 15 is a partial cross-sectional view of the extendable boom assembly of FIGS. 6-7 with an engagement member engaging a middle inner telescoping segment.
Figure 16:
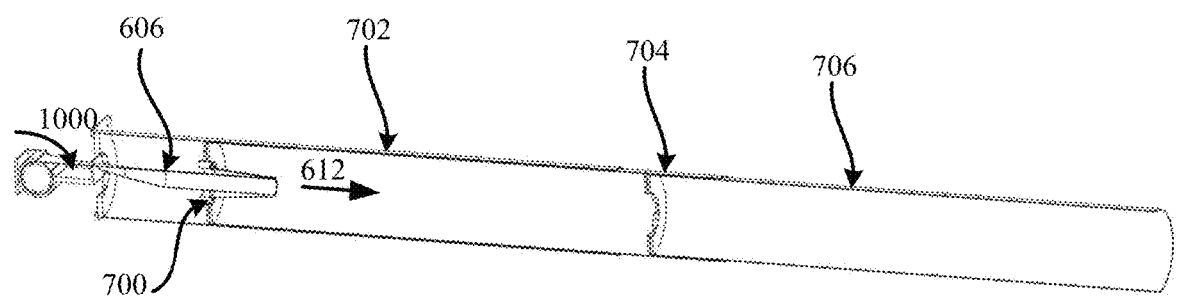
FIG. 16 is a cross-sectional view of the extendable boom assembly of FIGS. 6-7 with a middle telescoping segment in a partially extended configuration.
Figure 17:
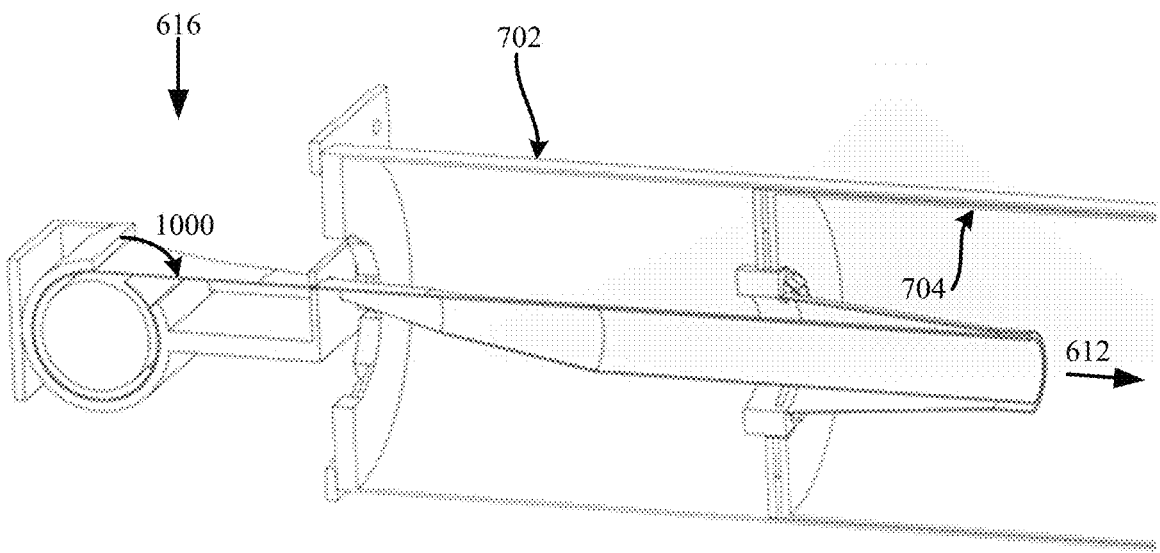
FIG. 17 is a partial cross-sectional view of the extendable boom assembly of FIGS. 6-7 with the middle telescoping segment in a partially extended configuration.

Once the telescoping segment 706 is coupled to adjacent telescoping segment 704, the motor detects that the slit tube can no longer be pushed towards the distal end of the boom. At this time, the motor begins rotating the spool 608 in a second direction opposed from the first direction. The second direction may comprise the counter clockwise direction 1300, as shown in FIG. 13. The present solution is not limited in this regard. The second direction can alternatively comprise the clockwise direction. In effect, the engagement member 700 disengages from the extended telescoping segment 706 and moves in a direction 614 towards the spool 608. The engagement member 700 continues to move in direction 614 until it engages and becomes coupled to the next inner telescoping segment 704, as shown in FIGS. 14-15. This coupling is achieved in the same or similar manner as that discussed above in relation to telescoping segment 706. For example, a resiliently biased pin 1900 is pushed through an aperture 1902 formed in the telescoping segment 702. The aperture 1902 can be aligned with or offset in one or more directions from aperture 1206 when the telescoping segments 702, 704 are collapsed. Thereafter, the process is repeated to extend the next inner telescoping segment 704, as shown in FIGS. 16-19.

Figure 18:
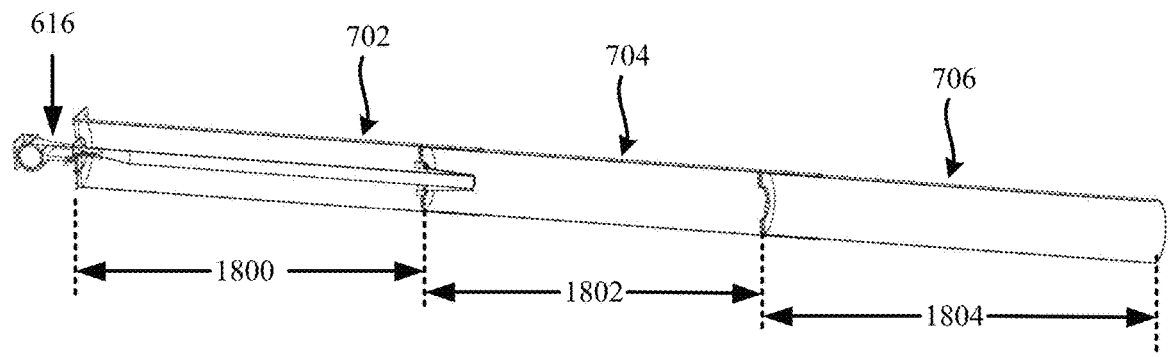
FIG. 18 is a cross-sectional view of the extendable boom assembly of FIGS. 6-7 with the inner most telescoping segment and the middle telescoping segment in partially extended configurations.
Figure 19:
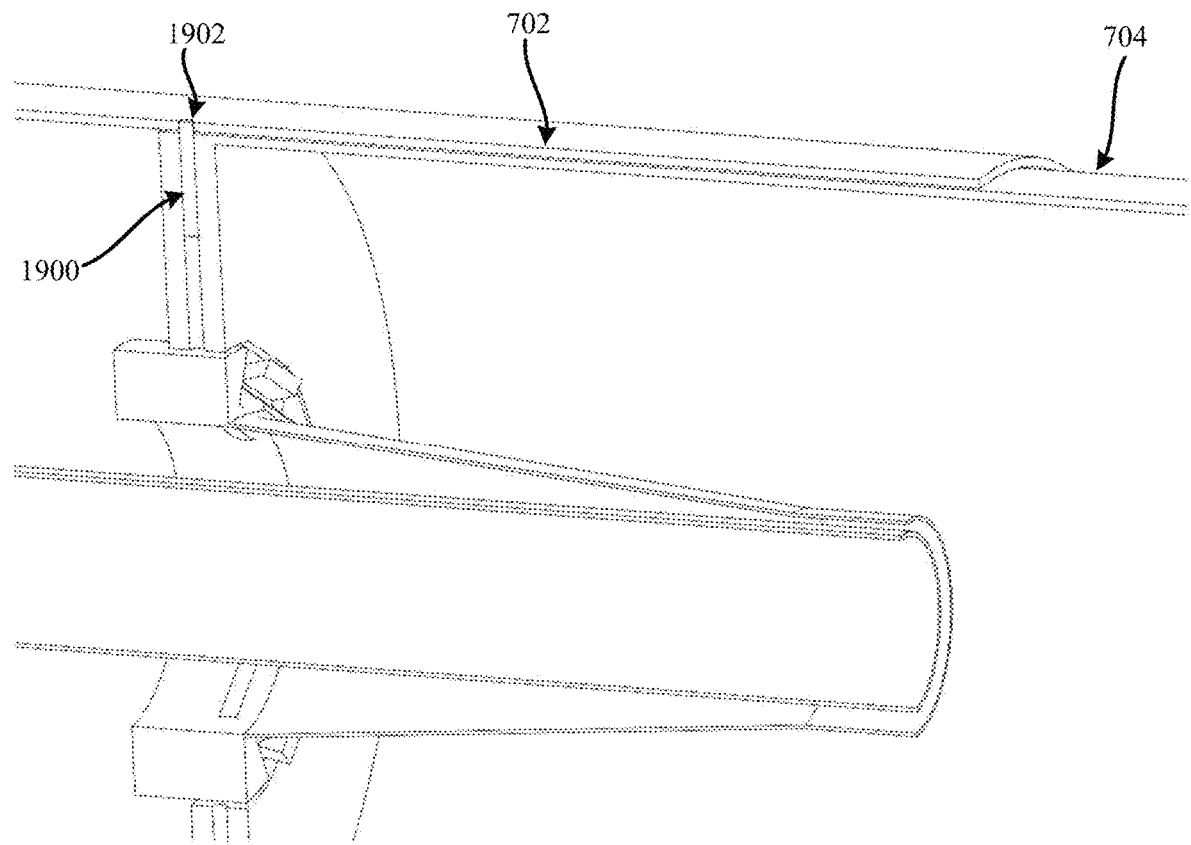
FIG. 19 is a partial cross-sectional view of the extendable boom assembly of FIGS. 6-7 with the middle telescoping segment coupled to an outer most telescoping segment.
Figure 20A:
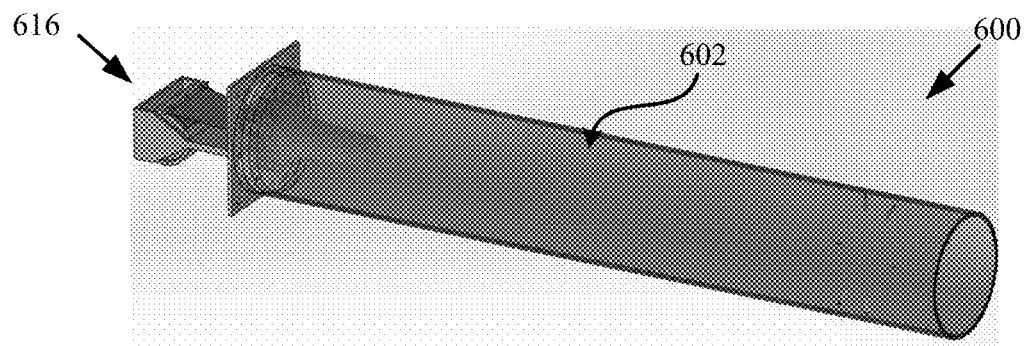
FIGS. 20A-20G (collectively referred to herein as "FIG. 20") provide illustrations of a boom extension process with telescoping segments shown in a semi-transparent state.
Figure 20B:
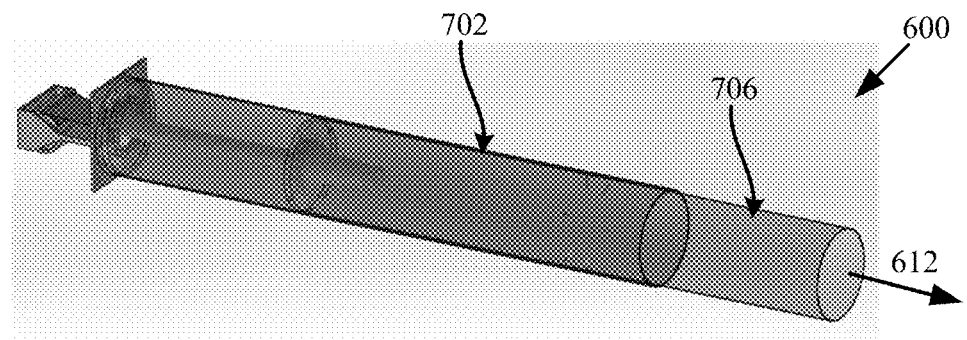
Figure 20C:
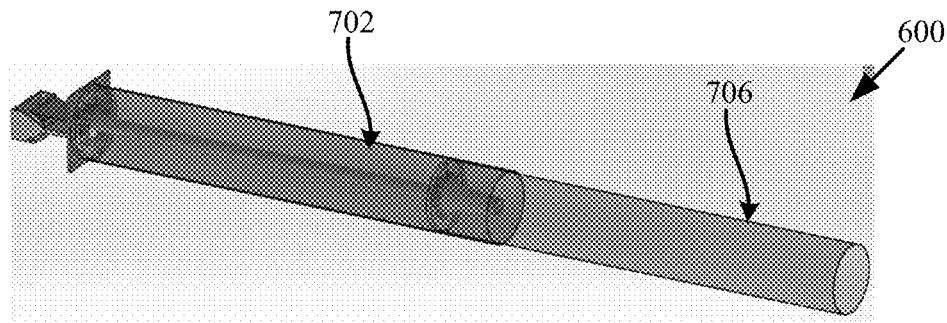
Figure 20D:
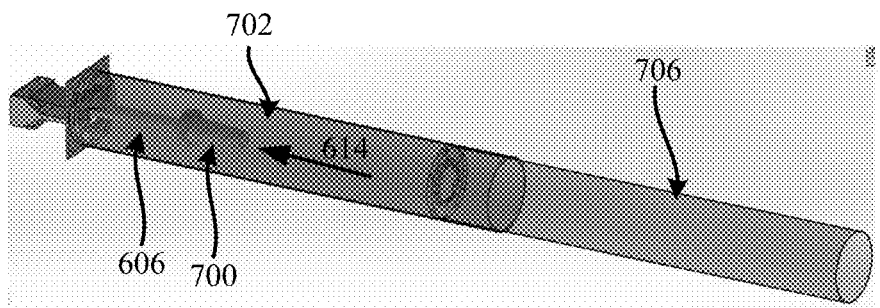
Figure 20E:
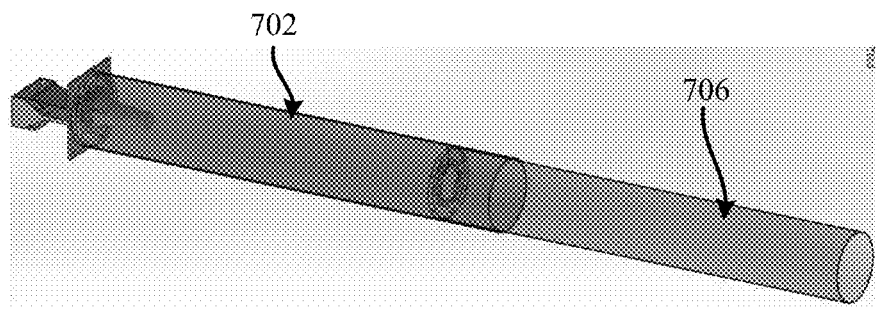
Figure 20F:
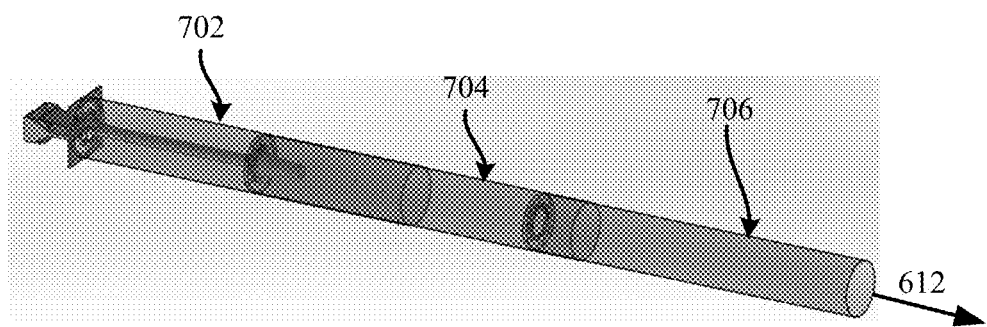
Figure 20G:
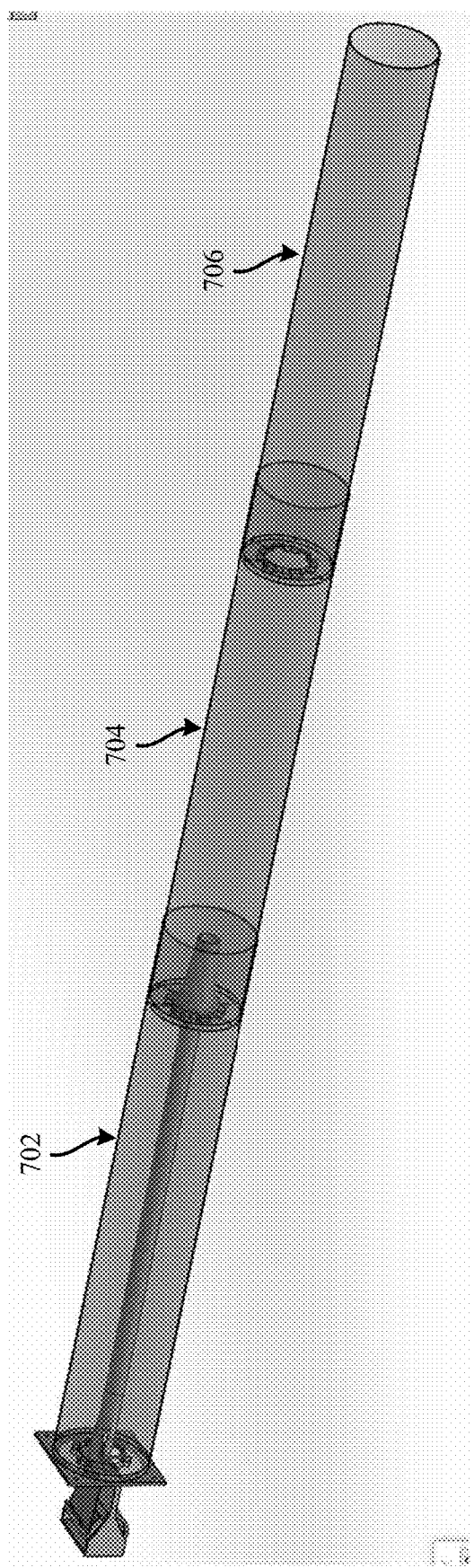

Notably, the slit-tube 606 only extends the length of a single telescoping segment when (1) each telescoping segment is extended and (2) when the boom reaches its fully extended configuration. Accordingly, the final length of an unspooled portion of the slit-tube 606 at the times when the boom reaches its partially extended configuration shown in FIG. 14 and its fully extended configuration shown in FIG. 18 is equal to or slightly larger than $1/N^{th}$ of the length of the fully extended boom, where N is the total length of all the telescoping segments 702-706. This is not the case in conventional boom assemblies. In conventional boom assemblies, the deployment structure extends the entire length of the partially or fully extended boom at all times during the boom extension process. This is an important distinction between the present solution and that of the conventional boom assemblies. For example, the present solution provides a boom assembly that is less complex, lighter, and less costly to manufacture as compared to that of conventional boom assemblies.

The telescoping segments 702-706 can have the same or different lengths 1800-1804. In some scenarios, length 1800 of the outer most telescoping segment 702 is smaller than lengths 1802, 1804 of the other telescoping segments 704, 706. This configuration of telescoping segment 702 may be employed so that the slit-tube does not buckle when the cords coupled to telescoping segment 702 are being tensioned during the extension of telescoping segment 704. The present solution is not limited to the particulars of these scenarios.

FIGS. 20A-20G provide illustrations of the boom extension process with the telescoping segments 702-706 shown in a semi-transparent state.

Referring now to FIG. 21, there is provided a flow diagram of an illustrative method 2100 for extending a boom (e.g., boom 104 of FIG. 1, 306 of FIG. 3, and/or 600 of FIGS. 6-19). Method 2100 begins with 2102 and continues with 2104 where a drive train assembly (e.g., drive train assembly 616 of FIGS. 6-19) is placed in a start configuration for extending a boom. The boom extension can involve sequentially extending a plurality of telescoping segments (e.g., telescoping segments 702-706 of FIGS. 6-19) of the boom.

Figure 22A:
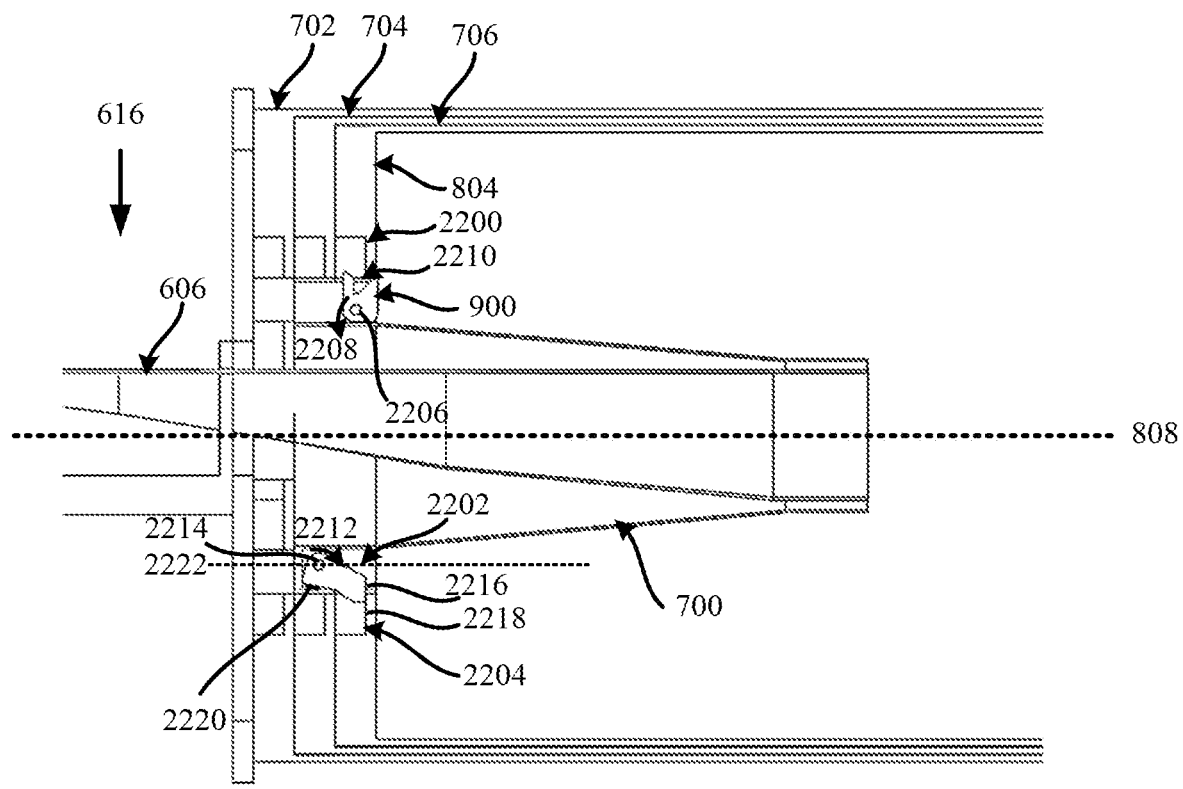
FIGS. 22A-22F (collectively referred to herein as "FIG. 22") provide illustrations that are useful for understanding the method of FIG. 21.

An illustration of an illustrative drive train assembly 616 in the start configuration is provided in FIG. 22A. As shown in FIG. 22, the slit-tube 606 is retracted on a spool 608 (not shown in FIG. 22A) such that the engagement member 700 is coupled to an inner most telescoping segment 706 of the boom 603.

The coupling of the engagement member 700 to the telescoping segment 706 is achieved using a mechanical coupling mechanism 900. The mechanical coupling mechanism 900 comprises a latch structure that is coupled to the engagement member 700. The latch structure can include, but is not limited to, a linear motion latch, a pusher latch with a coupling link or gear, or any other mechanism that clears a first step and catches on a second step. The latch structure may be shaped to perform both push and stop on the same part.

In some scenarios, the latch structure of the mechanical coupling mechanism 900 is able to pivot about a pivot point 2206. The latch structure is resiliently biased (e.g., via a spring not shown) in a direction 2208. The latch structure has an indent 2210 formed therein, and the base wall 804 has a notch 2200 formed therein. The indent 2210 and notch 2200 allow the latch structure to engage and capture the base wall 804 of the telescoping segment 706. This latching engagement ensures that only the telescoping segment 706 will be extended by the drive train assembly during a first period of time.

A second latch structure 2202 may also be provided. The second latch structure 2202 is coupled to the engagement member 700 on an opposite side from the side on which the mechanical coupling mechanism 900 resides. The latch structure 2202 can include, but is not limited to, a linear motion latch or any other mechanism that is able to catch behind a telescoping segment.

In some scenarios, the latch structure 2202 is able to pivot about a pivot point 2214, and is resiliently biased (e.g., via a spring not shown) in a direction 2212. A stop structure 2220 (e.g., a protrusion or post) is provided to prevent the latch structure 2202 from traveling in direction 2212 past a certain distance from a line 2222 which extends parallel to a center axis 808 of the boom. At least a portion of the latch structure 2202 extends into a notch 2204 formed in the base wall 804 of the telescoping segment 706. An engagement surface 2216 of the latch structure 2202 is in direct contact with an engagement surface 2218 of the base wall 804 of the telescoping segment 706.

Referring again to FIG. 21, a motor (e.g., motor 610 of FIGS. 6-19) is used in 2106 to rotate a spool (e.g., spool 608 of FIGS. 6-19) in a first direction (e.g., direction 1000 of FIG. 10 or 1300 of FIG. 13). This spool rotation causes the slit-tube to be unwound from the spool as shown by 2108 and extend longitudinally within the boom. As the slit-tube is being unwound from the spool, it applies a pushing force on the engagement member thereby causing the engagement member to travel in a direction towards a distal end of the collapsed boom. Since the engagement member is coupled to the inner most telescoping segment, the inner most telescoping segment is moved along with the engagement member in the direction towards the distal end of the collapsed boom (or in a direction away from a proximal end of the boom).

Figure 22B:
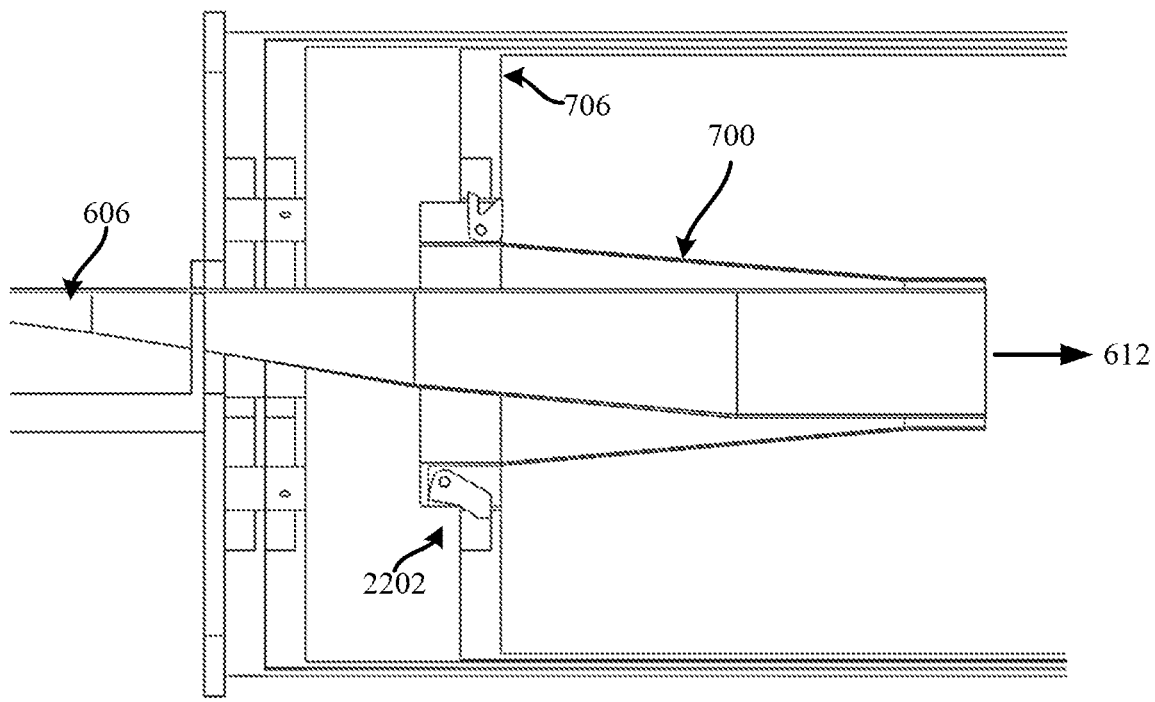

An illustration showing an illustrative telescoping segment 706 being moved in a direction 612 by the engagement member 700 is provided in FIG. 22B. The movement of the telescoping segment 706 is at least partially caused by a pushing force which is applied by the second latch structure 2202 to the base wall 804 of the telescoping segment 706.

As shown in FIG. 21, the spool rotation is continued in 2110 until the slit-tube is prevented from or otherwise can no longer travel in the direction towards the distal end of the collapsed boom. In 2112, the extended telescoping segment (e.g., telescoping segment 706 of FIGS. 6-19) is coupled to a collapsed adjacent middle telescoping segment (e.g., collapsed telescoping segment 704 of FIGS. 6-19). The coupling can be achieved using a resiliently biased pin (e.g., pin 1206 of FIG. 12).

Next, the motor is used in 2114 to rotate the spool in a second direction. The second direction is opposed from the first direction. For example, if the first direction is a counter clockwise direction, then the second direction is a clockwise direction. Alternatively, if the first direction is a clockwise direction, then the second direction is a counter clockwise direction. The present solution is not limited to the particulars of this example.

This spool rotation causes the slit-tube to be re-wound onto the spool, as shown by 2116. In effect, the engagement member of the drive train assembly is caused to move in a direction (e.g., direction 614 of FIG. 6) away from the distal end of the extended inner most telescoping segment.

Figure 22C:
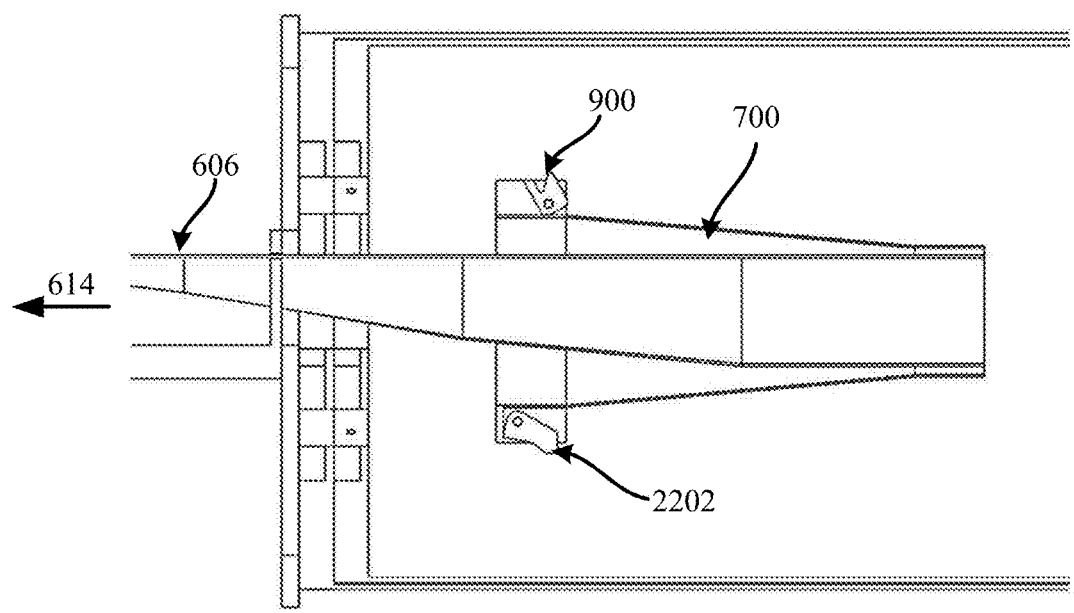
Figure 22D:
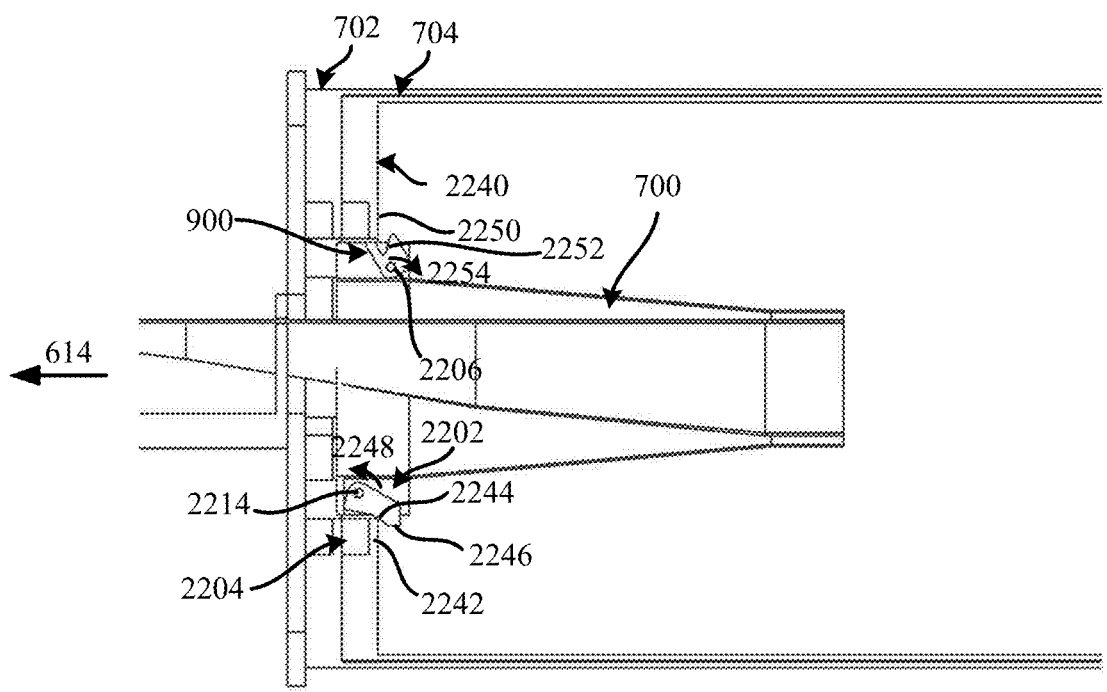
Figure 22E:
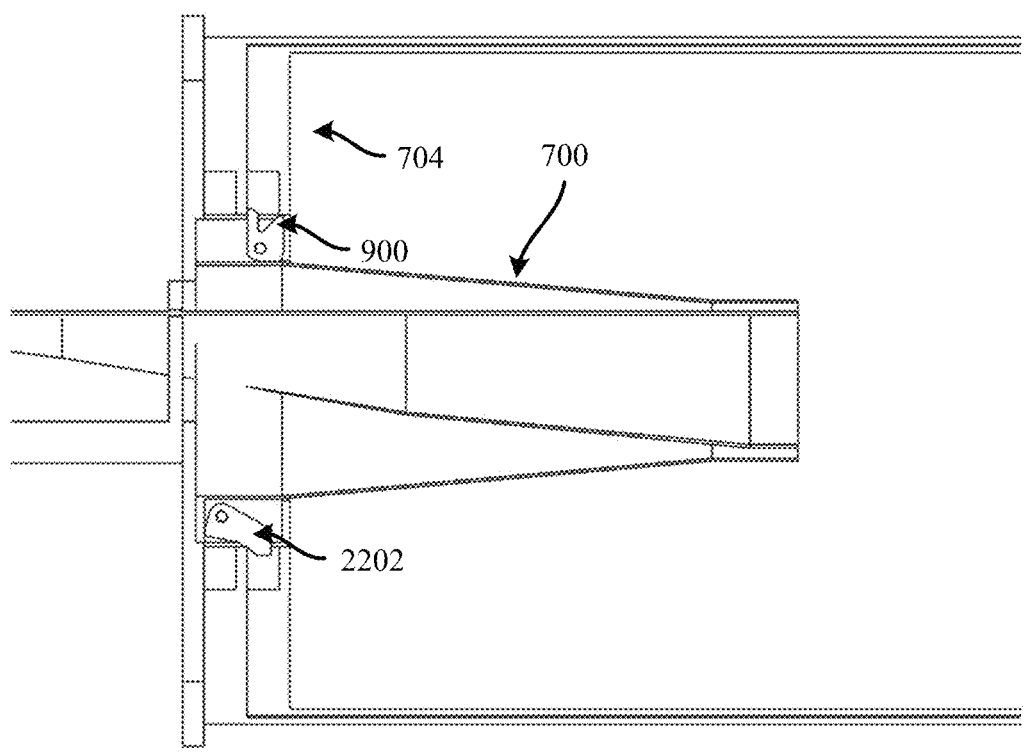

An illustration showing an illustrative engagement member 700 being moved in a direction 614 away from a distal end of the extended inner most telescoping segment 706 is provided in FIG. 22C. As the engagement member 700 moves in direction 614, the engagement member is decoupled from the telescoping segment 706. In this regard, the latch structures 900, 2202 are released from the base wall of the telescoping segment 706.

As shown in 2118 of FIG. 21, the re-winding of the slit-tube is continued until the engagement member of the drive train assembly is coupled to the collapsed middle telescoping segment (e.g., telescoping segment 704 of FIGS. 6-19). An illustration showing the illustrative engagement member 700 being coupled to the middle telescoping segment 706 is provided in FIG. 22D. An illustration showing the illustrative engagement member 700 coupled to the middle telescoping segment 704 is provided in FIG. 22E. This coupling is achieved in the same manner as that described above in relation to the engagement member's coupling to the inner most telescoping segment 706 via latch structures 900, 2202.

As the engagement member 700 is being pulled in direction 614, a portion 2242 of the base wall 2240 of the telescoping segment 704 slides against surfaces 2244, 2246 of the latch structure 2202. This sliding engagement between the base wall portion 2242 and the latch structure 2202 causes the latch structure 2202 to rotate above pivot point 2214 in a direction 2248. This rotation of the latch structure 2202 causes a resilient component (not shown) (e.g., a spring) to be compressed. This compression of the resilient component ensures that the latch structure 2202 will automatically be snapped into the notch 2204 when the latch structure 2202 becomes aligned therewith as a result of the engagement member 700 is being pulled in direction 614.

As the engagement member 700 is being pulled in direction 614, a portion 2250 of the base wall 2240 of the telescoping segment 704 comes in contact with a surface 2252 of the latch structure 900. The portion 2250 of the base wall 2240 applies a pushing force on the latch structure 900, which causes the latch structure 900 to rotate about pivot point 2206 in direction 2254. When the latch structure 900 rotates a certain amount in direction 2254, it is locked into position so that (a) the engagement member 700 and the telescoping segment 704 are latched together and (b) the engagement member 700 is prevented from traveling any further in direction 614. This ensures that the engagement member 700 does not become latched to the telescoping segment 702 in addition to the telescoping segment 704.

Referring again to FIG. 21, the motor is used in 2120 to rotate the spool in the first direction once again. This spool rotation causes the slit-tube to be unwound from the spool as shown by 2122 and extend longitudinally within the partially expanded boom. As the slit-tube is being unwound from the spool, it applies a pushing force on the engagement member thereby causing the engagement member to travel in a direction towards a distal end of the partially expanded boom. Since the engagement member is coupled to the middle telescoping segment, the middle telescoping segment is moved along with the engagement member in the direction towards the distal end of the partially expanded boom.

Figure 22F:
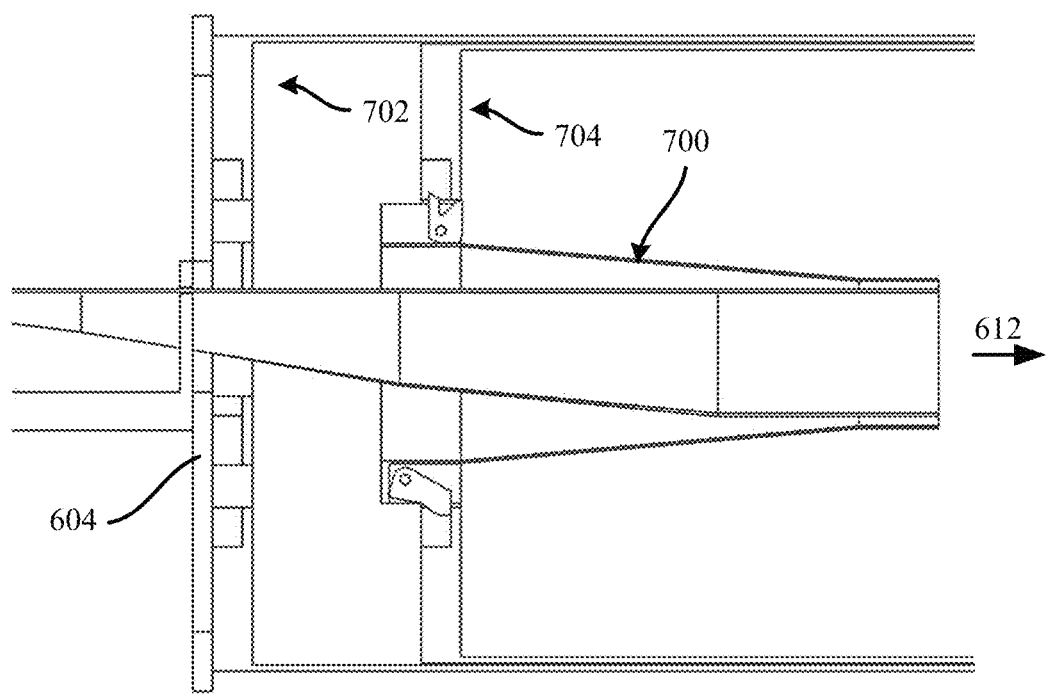

An illustration showing an illustrative telescoping segment 704 being moved in a direction 612 by the engagement member 700 is provided in FIG. 22F. The movement of the telescoping segment 704 is at least partially caused by a pushing force which is applied by the second latch structure 2202 to the base wall of the telescoping segment 704.

As shown in FIG. 21, the spool rotation is continued in 2124 until the slit-tube is prevented from or otherwise can no longer travel in the direction towards the distal end of the boom (or in a direction away from the proximal end of the boom). In 2126, the extended telescoping segment (e.g., telescoping segment 704 of FIGS. 6-19) is coupled to an outer most telescoping segment (e.g., telescoping segment 702 of FIGS. 6-19). The coupling can be achieved using a resiliently biased pin (e.g., pin 1902 of FIG. 19).

In some scenarios, the slit-tube is kept in its unwound position so as to provide structural support to the extended boom during use. In other scenarios, the slit-tube is rewound. Accordingly, method 2100 may continue with optional 2128. In 2128, the motor is used to rotate the spool in the second direction so that the slit-tube is once again re-wound onto the spool. As the slit-tube is being re-wound, the engagement member of the drive train assembly is caused to move in a direction (e.g., direction 614 of FIG. 6) away from the distal end of the extended telescoping segments (or in a direction towards the proximal end of the boom). The re-winding of the slit-tube is continued until the engagement member of the drive train assembly comes in contact with base plate (e.g., base plate 604 of FIGS. 6-19) of the boom assembly (e.g., boom assembly 600 of FIGS. 6-19).

The present solution is not limited to the particulars of method 2100. As should be understood, operations 2120-2128 can be iteratively performed any number of times depending on how many middle telescoping segments need to be extended from their collapsed position.

Also, the method can be modified to include additional operations for collapsing the boom. This boom collapsing process can involve sequentially transitioning the inner telescoping segment and middle telescoping segment(s) from their expanded positions to their collapsed positions.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for extending a boom, comprising:
   placing a drive train assembly in a start configuration in which an engagement member of the drive train assembly is coupled to an inner telescoping segment of the boom;
   rotating a spool in a first direction so as to unwind a slit-tube that is coupled to the engagement member;
   causing the inner telescoping segment to move in a direction away from a proximal end of the boom as the slit-tube is being unwound from the spool; and
   coupling the inner telescoping segment to an adjacent telescoping segment when the inner telescoping segment reaches an extended position;
   wherein the slit-tube extends a distance inside the boom that is equal to or less than a length of the adjacent telescoping segment when the inner telescoping segment is in the extended position.

2. The method according to claim 1, wherein the adjacent telescoping segment is a middle telescoping segment that resides between the inner telescoping segment and an outer telescoping segment, and the inner telescoping segment and the middle telescoping segment are sequentially extended by the drive train assembly.

3. The method according to claim 2, wherein the outer telescoping segment has a length that is shorter than lengths of the inner and middle telescoping segments.

4. The method according to claim 2, further comprising rotating the spool in a second direction so as to re-wind the slit-tube onto the spool, subsequent to when the inner telescoping segment is coupled to the middle telescoping segment.

5. The method according to claim 4, further comprising de-coupling the engagement member of the drive train assembly from the inner telescoping segment as the slit-tube is being pulled towards the proximal end of the boom during the slit-tube's re-winding.

6. The method according to claim 5, further comprising continuing to rotate the spool in the second direction until the slit-tube is prevented from traveling any further in a direction towards the proximal end of the boom.

7. The method according to claim 5, further comprising coupling the engagement member of the drive train assembly to the middle telescoping segment which is in a collapsed configuration.

8. The method according to claim 7, further comprising rotating the spool in the first direction so as to once again unwind the slit-tube from the spool.

9. The method according to claim 8, further comprising causing the middle telescoping segment to move in a direction away from the proximal end of the boom as the slit-tube is being unwound from the spool.

10. The method according to claim 9, further comprising coupling the middle telescoping segment to the outer telescoping segment when the middle telescoping segment reaches an extended position.

11. The method according to claim 10, wherein the slit-tube extends a distance inside the boom that is equal to or less than a length of the outer telescoping segment when the middle telescoping segment and the inner telescoping segment are in the extended position.

12. An extendable boom assembly, comprising:
a telescoping boom comprising an inner telescoping segment; and
a drive train assembly comprising a spool, a slit-tube coupled to the spool, and an engagement member that is coupled to the slit-tube and resides in the telescoping boom;
wherein the inner telescoping segment is extended by
placing the drive train assembly in a start configuration in which the engagement member is coupled to the inner telescoping segment,
rotating the spool in a first direction so as to unwind the slit-tube;
causing the inner telescoping segment to move in a direction away from a proximal end of the telescoping boom as the slit-tube is being unwound from the spool, and
coupling the inner telescoping segment to an adjacent telescoping segment of the telescoping boom when the inner telescoping segment reaches an extended position;
wherein the slit-tube extends a distance inside the telescoping boom that is equal to or less than a length of the adjacent telescoping segment when the inner telescoping segment is in the extended position.

13. The extendable boom assembly according to claim 12, wherein the adjacent telescoping segment is a middle telescoping segment that resides between the inner telescoping segment and an outer telescoping segment, and the inner telescoping segment and the middle telescoping segment are sequentially extended by the drive train assembly.

14. The extendable boom assembly according to claim 13, wherein the outer telescoping segment has a length that is shorter than lengths of the inner and middle telescoping segments.

15. The extendable boom assembly according to claim 13, wherein the spool is rotatable in a second direction for re-winding the slit-tube onto the spool, subsequent to when the inner telescoping segment is coupled to the middle telescoping segment.

16. The extendable boom assembly according to claim 15, wherein the engagement member of the drive train assembly is decoupled from the inner telescoping segment as the slit-tube is being pulled towards the proximal end of the boom during the slit-tube's re-winding.

17. The extendable boom assembly according to claim 16, wherein the spool is rotated in the second direction until the slit-tube is prevented from traveling any further in a direction towards the proximal end of the boom.

18. The extendable boom assembly according to claim 17, wherein the engagement member of the drive train assembly is coupled to the middle telescoping segment which is in a collapsed configuration.

19. The extendable boom assembly according to claim 18, wherein the spool is rotated in the first direction for unwinding the slit-tube from the spool once again.

20. The extendable boom assembly according to claim 19, wherein the middle telescoping segment is caused to move in a direction away from the proximal end of the boom as the slit-tube is being unwound from the spool.

21. The extendable boom assembly according to claim 20, wherein the middle telescoping segment is coupled to the outer telescoping segment when the middle telescoping segment reaches an extended position.

22. The extendable boom assembly according to claim 21, wherein the slit-tube extends a distance inside the boom that is equal to or less than a length of the outer telescoping segment when the middle telescoping segment and the inner telescoping segment are in the extended position.

* * * * *